United States Patent
Gupta et al.

(10) Patent No.: US 10,628,289 B2
(45) Date of Patent: Apr. 21, 2020

(54) MULTIVARIATE PATH-BASED ANOMALY PREDICTION

(71) Applicant: CA, Inc., New York, NY (US)

(72) Inventors: Smrati Gupta, San Jose, CA (US); Erhan Giral, Saratoga, CA (US); David Sanchez Charles, Barcelona (ES); Victor Muntés-Mulero, Saint Feliu de Llobregat (ES)

(73) Assignee: CA, Inc., New York, NY (US)

( * ) Notice: Subject to any disclaimer, the term of this patent is extended or adjusted under 35 U.S.C. 154(b) by 29 days.

(21) Appl. No.: 15/939,893

(22) Filed: Mar. 29, 2018

(65) Prior Publication Data
US 2019/0294524 A1   Sep. 26, 2019

(30) Foreign Application Priority Data
Mar. 26, 2018   (ES) .................................. 201830294

(51) Int. Cl.
G06F 9/44 (2018.01)
G06F 11/36 (2006.01)
G06F 11/30 (2006.01)
G06F 11/34 (2006.01)

(52) U.S. Cl.
CPC .......... *G06F 11/364* (2013.01); *G06F 11/302* (2013.01); *G06F 11/3466* (2013.01)

(58) Field of Classification Search
CPC ... G06F 11/302; G06F 11/3466; G06F 11/364
USPC ................................................. 717/126–128
See application file for complete search history.

(56) References Cited

U.S. PATENT DOCUMENTS

| | | | | |
|---|---|---|---|---|
| 5,341,142 | A * | 8/1994 | Reis ...................... | F41G 7/2226 244/3.15 |
| 6,678,569 | B2 * | 1/2004 | Bunkofske ......... | G05B 23/0221 257/E21.525 |
| 9,652,354 | B2 * | 5/2017 | Filimonov .......... | G06F 11/3409 |
| 9,921,937 | B2 * | 3/2018 | Seto ...................... | G06F 11/008 |
| 2014/0039274 | A1 * | 2/2014 | Sarrafzadeh .......... | A61B 5/1118 600/300 |
| 2015/0205691 | A1 * | 7/2015 | Seto ...................... | G06F 11/008 702/182 |

(Continued)

OTHER PUBLICATIONS

Al-Haj Baddar et al., "Anomaly Detection in Computer Networks: A State-of-the-Art Review", 2014, Journal of Wireless Mobile Networks, Ubiquitous Computing, and Dependable Applications, vol. 5, No. 4, pp. 29-64 (Year: 2014).*

(Continued)

*Primary Examiner* — Ted T. Vo
(74) *Attorney, Agent, or Firm* — Foley & Lardner LLP

(57) ABSTRACT

A multivariate path-based anomaly detection and prediction service ("anomaly detector") can generate a prediction event for consumption by the APM manager that indicates a likelihood of an anomaly occurring based on path analysis of multivariate values after topology-based feature selection. To predict that a set of metrics will travel to a cluster that represents anomalous application behavior, the anomaly detector analyzes a set of multivariate date slices that are not within a cluster to determine whether dimensionally reduced representations of the set of multivariate data slices fit a path as described by a function.

20 Claims, 13 Drawing Sheets

(56) References Cited

U.S. PATENT DOCUMENTS

2015/0205693 A1* 7/2015 Seto .................... G06F 11/3065
702/186
2018/0032385 A1* 2/2018 Shivaji ................ G06F 11/0727

OTHER PUBLICATIONS

Park et al., "Dimension Reduction in Time series", 2010, Statistica Sinica Journal, pp. 747-770 (Year: 2010).*
Tan, et al., "PREPARE: Predictive Performance Anomaly Prevention for Virtualized Cloud Systems", 32nd IEEE International Conference on Distributed Computing Systems, 2012, pp. 285-294.

* cited by examiner

MULTIVARIATE PATH-BASED ANOMALY PREDICTION

BACKGROUND

The disclosure generally relates to the field of data processing, and more particularly to software development, installation, and management.

Generally, a distributed application is an application that includes software components that are distributed across multiple networked host machines which may be physical machines or virtual machines. The distributed application presents an interface(s) to a client for requesting a transaction to be performed. Performing the transaction includes performing multiple operations or tasks, or "end-to-end" tasks of the transaction. Each component of the distributed software application handles a different subset of those tasks. This application architecture allows for a more flexible and scalable application compared with a monolithic application.

Large-scale distributed applications have a variety of components including web services and/or microservices. A distributed tracing tool can be used to trace an execution path through these various components. As the software components are executed (e.g., remote procedure calls, remote invocation calls, application programming interface (API) function invocations, etc.), identification of the component is recorded, and the sequence of calls/invocations are correlated to present the execution path.

BRIEF DESCRIPTION OF THE DRAWINGS

Embodiments of the disclosure may be better understood by referencing the accompanying drawings.

DESCRIPTION

Figure 1:
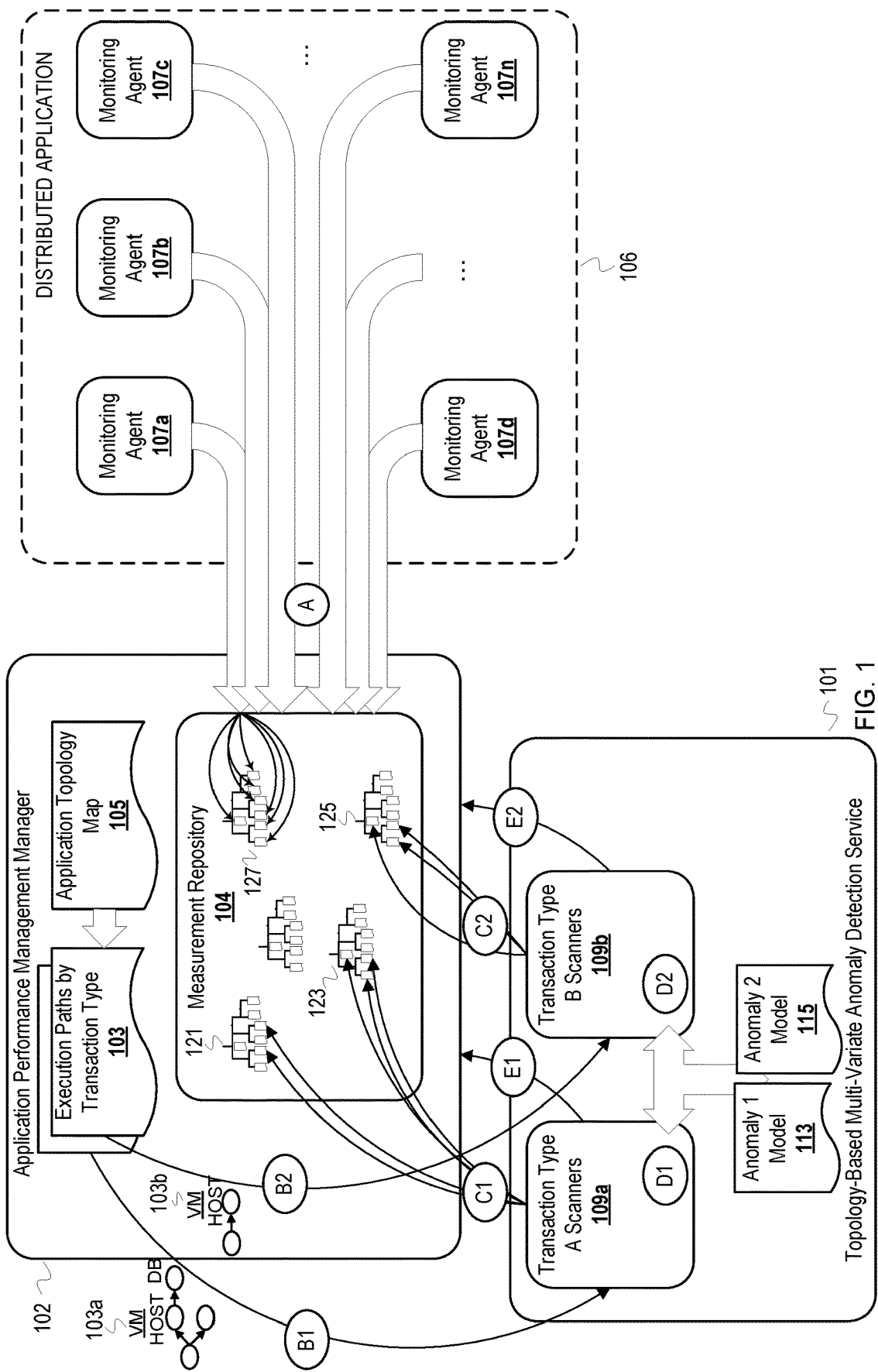
FIG. 1 is a diagram of a topology-based multi-variate anomaly detection service that intelligently selects features by transaction type to detect anomalies and predict future anomalies.

The description that follows includes example systems, methods, techniques, and program flows that embody the disclosure. However, it is understood that this disclosure may be practiced without these specific details. For instance, the description refers to a service (e.g., APM manager and anomaly detection service), but the described functionality can be embodied as tools or applications that are not necessarily services. In other instances, well-known instruction instances, protocols, structures and techniques have not been shown in detail in order not to obfuscate the description.

Introduction

A large-scale distributed application can include numerous software components distributed across an infrastructure comprising numerous machines (e.g., servers, storage arrays, routers, etc.). The distributed application provides different transactions to clients (e.g., customer check-in, purchasing, etc.) that variously traverse the application components and the infrastructure layer (e.g., routers, storage arrays, etc.) that supports them. Monitoring agents are deployed throughout the components of the layers of a distributed application (e.g., an infrastructure layer and an application layer). The monitoring agents determine measurements for application related metrics and report them to an application performance management manager ("APM manager"). An "application related metric" refers to a measurable attribute of a component(s) of an application, examples of which include available memory, number of active sessions, throughput, latency, average response time, responses per interval, stall counts, and errors per interval. The APM manager detects events that likely impact application performance and/or correspond to the application operating in an undesirable way. An event that impacts application performance is considered an anomaly or indication of an anomaly because it corresponds to behavior that is anomalous with respect to canonical application behavior. An anomaly event may be directly based on an application related metric or derived from one or more application related metrics. An anomaly event can be generated from the distributed application (e.g., component restart event) or can be generated based on a measurement(s) or value computed from measurements (e.g., an average of measurements). For instance, an anomaly event may indicate that average response time of a component or for a transaction exceeds a defined threshold. This comparison of a measurement against a threshold is typically how anomalies are detected. The APM manager analyzes those events to diagnose the cause of the events and determine a corrective action. In addition, an anomaly can take a significant amount of time to resolve and continue to cause application issues before the resolution takes place.

Many anomalies correlate to multiple application related metrics instead of a single application related metric. Measurements of a set of application related metrics (hereinafter "metrics") over time indicate a behavior of the set of metrics as represented by a trend among the multiple metrics ("pattern"). However, reading and analyzing (collectively "scanning") all measurements of all metrics monitored is at least computationally challenging. Monitoring agents of a distributed application may be monitoring thousands of instances of metrics (e.g., 30 categories of metrics across hundreds of components) resulting in the generation of half a million measurements per hour, assuming a sampling rate of 60 seconds. In addition to the measurements collected at the sampling rate, other measurements are passively collected (e.g., injected measurement logic). Searching a 1000-dimensional space for a pattern or making predictions about which future patterns will be detected is not only computationally challenging but such efforts would be counterproductive by producing effectively useless results either due to the volume of patterns detected or the amount of noise in the detected patterns.

Overview

A multivariate path-based anomaly detection and prediction service ("anomaly detector") can generate a prediction event for consumption by the APM manager that indicates a likelihood of an anomaly occurring based on path analysis of multivariate values after topology-based feature selection. The anomaly detector reads in time-series data (i.e., measurements of application related metrics) collected and/or generated from monitoring agents. The anomaly detector accumulates the time-series data across a series of time instants to form a multivariate time-series data slice or multivariate data slice. The anomaly detector then performs multivariate clustering analysis with the multivariate data slice. The anomaly detector determines whether a dimensionally reduced representation of a multivariate data slice is within a cluster of multivariate data slices. If the reduced representation is within the cluster and the cluster is a known anomaly cluster (i.e., a cluster of multivariate data slices correlated to a known anomaly), then the anomaly detector generates an anomaly detection event indicating detection of the known (i.e., named) anomaly. For reduced representations of multivariate data slices determined to not be within a cluster, the anomaly detector can perform additional analysis to form a prediction. To predict that a set of metrics will travel to a cluster that represents anomalous application behavior, the anomaly detector analyzes a set of multivariate date slices that are not within a cluster to determine whether dimensionally reduced representations of the set of multivariate data slices fit a path as described by a function. The anomaly detector stores a preceding n–1 multivariate data slices and/or their reduced representations. When the reduced representation of the nth multivariate data slice is determined as not being in a cluster, the anomaly detector determines whether the n reduced representations occur on the path described by the function. If the n reduced representations occur on the path, then the anomaly detector can generate a prediction event that the distributed application is approaching the anomaly based on the set of metrics behavior. These prediction events can be consumed by the APM Manager to take proactive measures before the anomaly occurs and/or perform root cause analysis with the additional path information.

Example Illustrations of Topology-Based Feature Selection

FIG. 1 is a diagram of a topology-based multi-variate anomaly detection service that intelligently selects features by transaction type to detect anomalies and predict future anomalies. FIG. 1 depicts monitoring agents 107a-107n deployed across components of a distributed application 106. The monitoring agents 107a-107n communicate with an APM manager 102. The APM manager 102 creates and maintains an application topology map 105 for the distributed application 106. The APM manager 102 also creates and maintains traces or execution paths 103. Since the distributed application 106 is presumed to provide multiple types of transactions and each instance of a transaction type likely does not traverse a same execution path, FIG. 1 illustrates multiple execution paths for the presumed multiple transaction types. FIG. 1 also depicts an example architecture of a topology-based multi-variate anomaly detection service 101. The topology-based multi-variate anomaly detection service 101 scans for known anomalies based on anomaly models loaded into or accessible by the topology-based multi-variate anomaly detection service 101.

The anomaly models include a model 113 for an anomaly 1 and a model 115 for an anomaly 2. The known anomalies are typically named for human comprehension to facilitate efficient triage/troubleshooting. For instance, anomaly 1 may be "memory leak" and anomaly 2 may be "death by a thousand cuts." The models can be defined based on expert knowledge that identifies behavior of a set of metrics that correlate to a performance issue. An anomaly model describes this behavior or pattern formed by measurements of a specified set of metrics over time that correlates to the anomaly ("anomaly blame metrics") represented by the model. The anomaly blame metrics may be for a single component ("intra-component") or among multiple components ("cross-component"). An anomaly model for APM specifies a component type(s) (e.g., virtual machine, router, database) and the anomaly blame metrics of the specified component type(s). The anomaly model can describe the behavior of the anomaly blame metrics with different techniques. For instance, the anomaly model can "describe the behavior" with a covariance matrix generated from multivariate analysis of covariance (MANCOVA) from previously evaluated measurements correlated with an anomaly (e.g., lab measurements and/or actual deployed product measurements). The covariance indicated by the covariance matrix represents the pattern of the anomaly blame metrics. As another example, an APM anomaly model can describe the behavior of the set of metrics with a set of conditions to evaluate the pattern formed by measurements of the blame metrics. The conditions can be based on directions of measurements, rate of change of measurements of a metric with respect to one or more other metric measurements, frequency of directional changes across metrics, and changes in measurements with respect to external factors (e.g., time of day). As another example, an anomaly model can include a set of functions that represent a pattern formed by measurements of blame metrics. Examples of the set of functions include an average, summation, and decompositions (e.g., decompose into a trend component, cyclical component, seasonal component, a noise component).

FIG. 1 includes stages A-E2 as example stages of operation to aid in illustrating operation of the topology-based multi-variate anomaly detection service 101. Each stage can correspond to one or multiple operations. The described example stages of operations should not be used to limit scope of the claims.

During a stage A, the monitoring agents 107a-107n communicate a vast number of metric measurements for the distributed application 106 to the APM manager. As previously indicated, the measurements can span a variety of types of metrics and different layers of the distributed application. These measurements are written into a measurement repository 104 of the APM manager 102. The monitoring agents 107a-107n and/or the APM manager 102 writes the measurements as time-series data (i.e., into data structures that reflect that collection of measurements over time). Measurements can be a transaction, underlying hardware components, individual software components, etc. This illustration focuses on the measurements per component. The measurement repository 104 is illustrated to represent organization of at least some measurements by component. Regardless of the specific implementation of the measurement repository 104, measurements can be accessed by component identifier. A component identifier may encode a host identifier and a specific component identifier (e.g., HOST1_VM).

When the topology-based multi-variate anomaly detection service 101 starts, the service 101 queries the APM manager 102 for the execution paths 103 of the distributed application 106. Before querying for the execution paths, the service 101 may query the APM manager 102 for the transaction types provided by the distributed application 106, if not already known (e.g., programmed/configured into the service 101). With the simple example of two transaction types, the service 101 at stage B1 determines an execution path 103a for a transaction type A and at stage B2 determines an execution path 103b for a transaction type B. Based on the execution paths, the service 101 instantiates scanners to scan the components of the execution paths for anomalies. The service 101 instantiates scanners 109a for the transaction type A and scanners 109b for the transaction type B. In this example architecture, the scanners 109a-109b are programmed to read the time-series measurements from the measurement repository 104 to form multivariate data slices and analyze the multivariate data slices against the anomaly models 113, 115.

The service 101 determines components and metric instances in the execution paths relevant to each of the anomaly models, and then instantiates the scanners accordingly. For this illustration, anomaly 1 model 113 describes behavior of blame metrics of a virtual machine. The anomaly 2 model 115 describes the blame metrics of a database. The entries 121 (e.g., records, subtree nodes, etc.) of the measurement repository 104 include time-series measurements of metrics collected for a database instance of the distributed application 106 in the execution path 103a. The entries 123 include time-series measurements of metrics collected for a host in the execution path 103a and for a virtual machine on the host. The entries 123 include time-series measurements of metrics collected for a host in the execution path 103b and for a virtual machine on the host. The service 101 determines that the anomaly 1 model 113 indicates blame metrics of a virtual machine for the represented anomaly, and then identifies an instance of a virtual machine in the execution path 103a. The service 101 instantiates one of the scanners 109a to read the entries 123 that correspond to the blame metrics indicated in the anomaly 1 model 113 at stage C1 and analyze the measurements read from entries 123 at stage D1 to detect whether the measurements form a pattern indicated in the model 113. The service 101 also identifies the instance of the virtual machine in the execution path 103b as relevant to the model 113, and instantiates one of the scanners 109b to read the entries 125 that correspond to the blame metrics of the model 113 at stage C2. At stage D2, the instantiated scanner 109b determines whether measurements read from the entries 125 form the pattern indicated in the model 113. For the anomaly 2 model 115, the service 101 determines that that the model 115 indicates a database as a relevant type of component. The service 101 determines that the execution path 103b does not include a database instance and does not instantiate a corresponding scanner. The service 101 determines that the execution path 103a includes a database instance, which is a relevant component type for the model 115. The service 101 determines the blame metrics of anomaly 2 as indicated in the model 115 and instantiates one of the scanners 109a to read the blame metric measurements from the entries 121 for the database instance in the execution path 103a at stage C1. The service 101 also instantiates the scanner to determine whether measurements read from the entries 121 form a pattern indicated in the model 115 for anomaly 2 at stage D1.

If one of the scanners 109a, 109b detects a pattern corresponding to either of the anomalies represented by the models 113, 115, then the scanner generates an event for consumption by the APM manager 102. At stage E1, one of the scanners 109a determines that measurements read from the measurement repository 104 form a pattern indicated in one of the models 113, 115 and generate a corresponding event. The event indicates the anomaly name and corresponding component(s) of the distributed application 106. The event can also indicate the transaction type, and other information that can be used for triage of the named anomaly. At stage E2, the scanner 109b detects a pattern in measurements read from the entries 125 that satisfies the pattern indicated in the model 115. Due to the dynamic nature of applications, the service 101 intermittently or periodically refreshes the execution paths that inform the scanning. Over time, execution paths can change and different transaction types can become active/dormant. For example, certain types of transactions may not be performed during business hours. Thus, an APM manager may not have an execution path for an inactive or dormant transaction type.

The implementation illustrated in FIG. 1 is an example illustration. Embodiments can instantiate scanners differently according to available resources, policies, etc. For instance, a topology-based multi-variate anomaly detection service can divide the labor of identifying and reading blame metrics indicated in an anomaly model for relevant components from analyzing the measurements to detect an anomaly pattern. The topology-based multi-variate anomaly detection service can instantiate an analyzer per anomaly model and instantiate a reader per relevant component instance of available/active execution paths per anomaly model. For example, the detection service instantiates 4 readers when x execution paths include 4 different instances of a component relevant to an anomaly model. These 4 readers can read time-series measurements into data structures for analysis (e.g., matrices) and insert them into an input queue for the analyzer instantiated for the anomaly model. Embodiments can also program scanners to form multivariate data slices and invoke analyzer program code with arguments that include an anomaly model identifier and the multivariate data slice.

Figure 2:
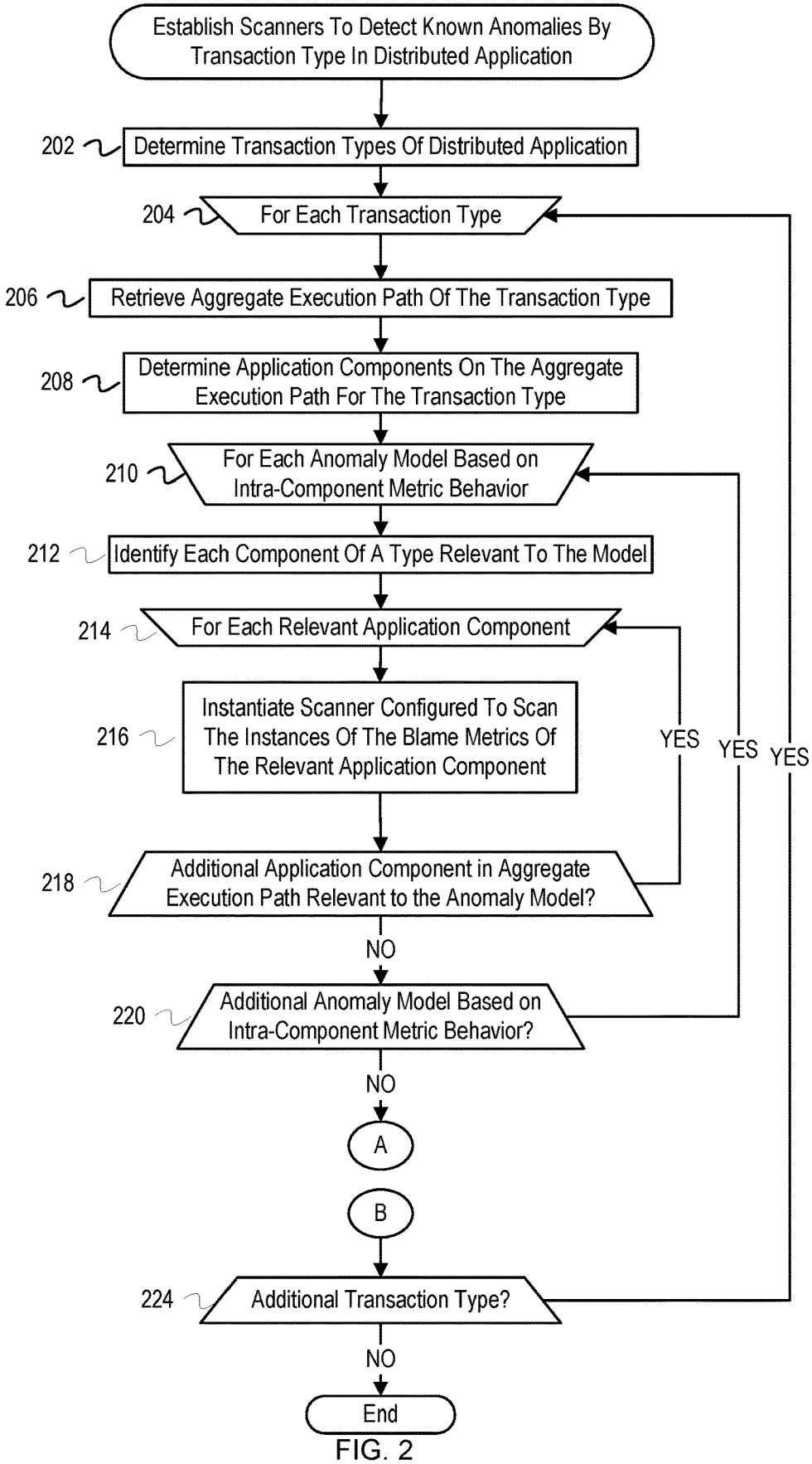
FIGS. 2-3 illustrate a flowchart of example operations for establishing scanners to detect known anomalies by transaction type in a distributed application.
Figure 3:
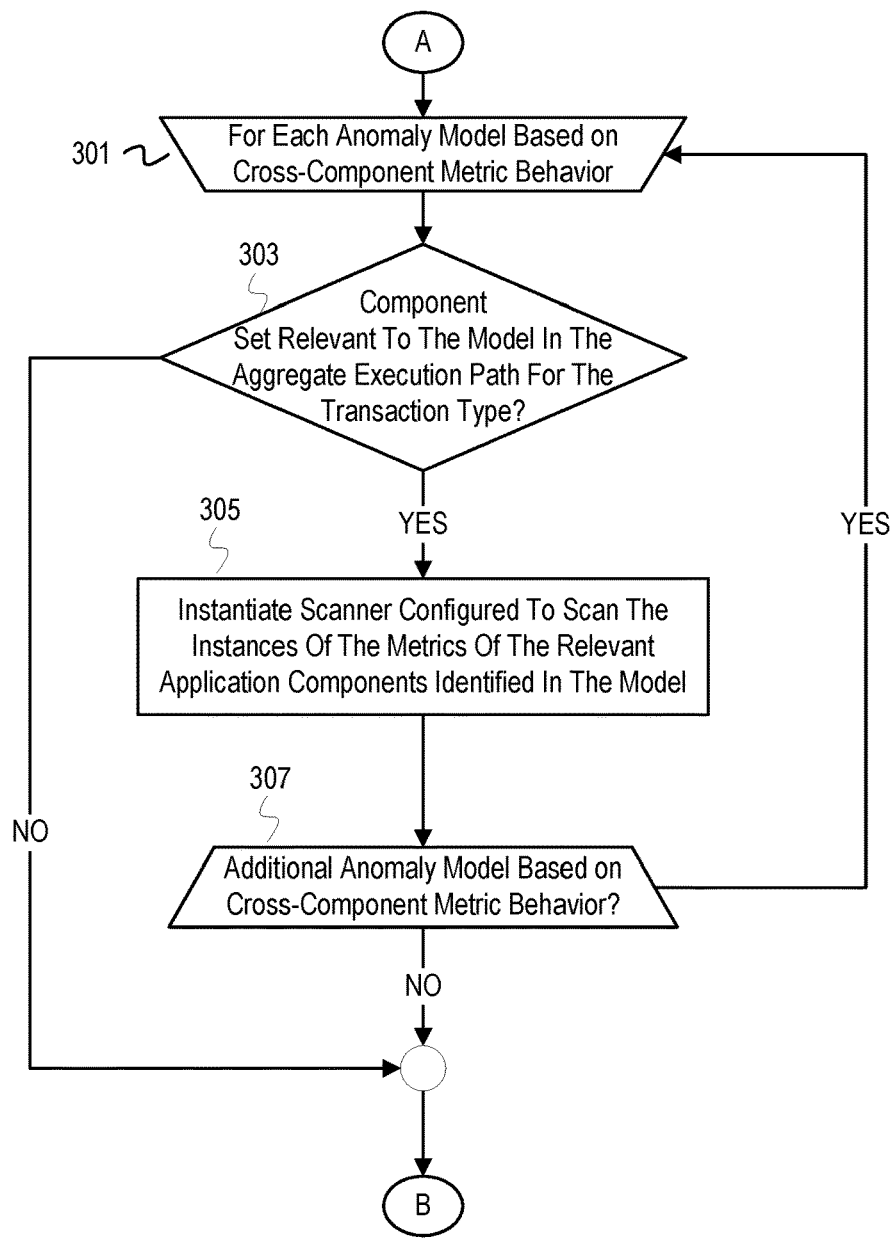

FIGS. 2-3 illustrate a flowchart of example operations for establishing scanners to detect known anomalies by transaction type in a distributed application. The description of FIGS. 2-3 refers to an anomaly detector as performing the operations. The anomaly detector for these example operations instantiates a scanner for each relevant component of each known anomaly model loaded into the anomaly detector for each transaction type execution path. The example operations of FIGS. 2-3 distinguish between an intra-component anomaly model and a cross-component anomaly model.

The anomaly detector initially determines transaction types of a distributed application associated with the anomaly detector (202). The anomaly detector may query an APM manager to determine transaction types if not already input to the anomaly detector. The anomaly detector determines the provided types of transactions based on an assumption that each transaction type will have a different execution path and/or that a detected anomaly should be associated with a transaction type.

For each determined transaction type (204), the anomaly detector gathers information to instantiate appropriate scanners for each known anomaly model relevant to the transaction type. The description refers to a transaction type in a current iteration as a current transaction type. The anomaly detector retrieves an aggregate execution path of the current transaction type (206). Each instance of the current transaction type can have some variation in execution path. Therefore, the execution paths of multiple instances of a same transaction type can be aggregated into a single execution path. The anomaly detector then determines application components on the aggregate execution path for the current transaction type (208). Each node in the execution path corresponds to a component of the distributed application and each component will be identified (e.g., network address, host name concatenated with component name, etc.). In addition to an identifier, the node in the execution path either indicates a type of the component or the component identifier can be used to determine component type.

For each anomaly model based on intra-component metric behavior (210), the anomaly detector determines relevant components to scan. The description refers to an intra-component anomaly model of a current iteration as a current intra-component anomaly model. The anomaly detector identifies each component in the execution path of the current transaction type that is relevant to the current intra-component anomaly model (212). Each component in the current transaction type execution path of a same type as that indicated in the current intra-component anomaly model is determined to be relevant. For each relevant component in the current transaction type execution path (214), the anomaly detector instantiates a scanner configured to scan the instances of the blame metrics of the relevant application component (216). The anomaly detector can invoke a subroutine that instantiates a process/thread to read time-series measurements of blame metrics identified in the current intra-component anomaly model. To "configure" the scanner, the anomaly detector can invoke the subroutine with arguments that include indications of the blame metrics and an identifier of the relevant component identifier. The scanner can be programmed with the protocol to access an APM measurement repository and use component identifier and indications of the blame metrics to access the measurements for detection of the known anomaly represented by the current intra-component anomaly model. The anomaly detector can also "configure" the analyzing aspect of the scanner by passing as arguments the anomaly model and a subroutine identifier for the particular analysis to be performed, if any. In some cases, the anomaly model embodies logic and/or conditions that collectively describe a pattern of blame metric measurements that correlate to the known anomaly. If an anomaly event should identify a transaction type, then an indication of the transaction type is associated with the scanner for propagation into a generated anomaly detection event. After instantiation of the configured scanner, the anomaly detector determines whether there is an additional application component in the aggregate execution path of the current transaction type that is relevant to the current intra-component anomaly model (218). If so, then the anomaly detector proceeds to instantiating the scanner for that relevant component. Otherwise, the anomaly detector determines whether there is an additional intra-component anomaly model to process (220). If there is not an additional intra-component anomaly model to process, the anomaly detector proceeds to any installed anomaly models based on cross-component metric behavior (FIG. 3). After processing cross-component anomaly models for the current transaction type, the anomaly detector proceeds to the next transaction type, if any (224).

FIG. 3 continues from FIG. 2 for any installed cross-component anomaly models. The operations in FIG. 3 are similar to those for intra-component anomaly models (210, 212, 214, 216, 220). For each anomaly model based on cross-component metric behavior (301), the anomaly detector determines relevant component sets to scan. The anomaly detector determines whether there is a set of components in the aggregate execution path of the current transaction type that is relevant to the cross-component anomaly model (303). In addition to relevancy based on component types, a cross-component anomaly model can indicate a degree of adjacency or connection for blame metrics among a set of components. A pattern of measurements of blame metrics across components in a cross-component anomaly model may be limited to occurring when those relevant components are adjacent to each other, for instance. If the execution path of the current transaction type includes the relevant component set (214), then the anomaly detector instantiates a scanner configured to scan the instances of the blame metrics of the relevant application components (305). After instantiation of the configured scanner, the anomaly detector determines whether there is an additional cross-component anomaly model to process (307). If there is not an additional cross-component anomaly model to process, the anomaly detector proceeds to a next transaction type (224).

Figure 4:
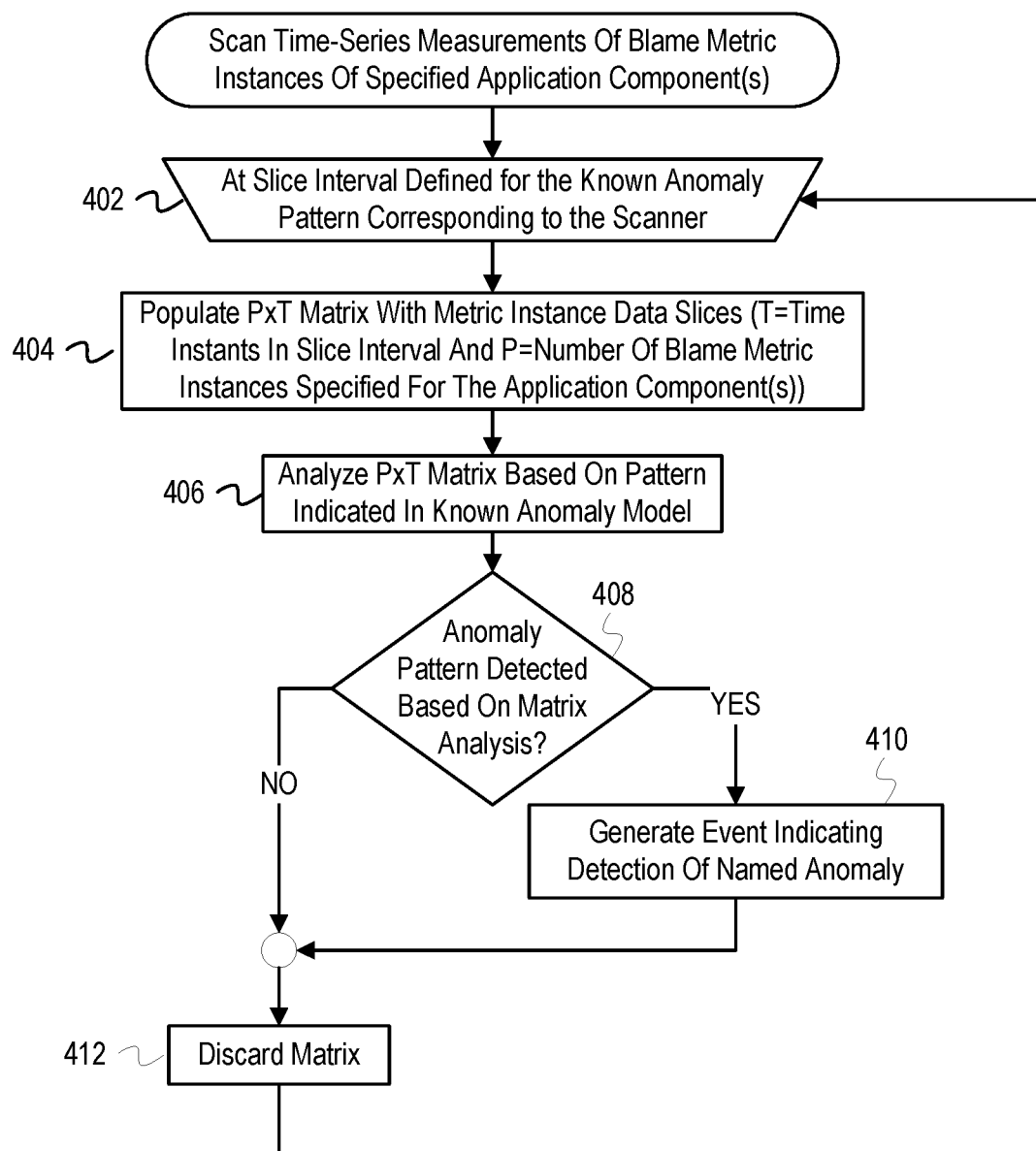
FIG. 4 is a flowchart of example operations for scanning time-series measurements of instances of blame metrics of a specific application component(s).

FIG. 4 is a flowchart of example operations for scanning time-series measurements of instances of blame metrics of a specific application component(s). The example operations of FIG. 4 represent the operations performed by instantiated scanners. The description of FIG. 4 refers to a scanner as performing the example operations. The example operations presume the scanner has been configured or instantiated with an identifier of an application component or identifiers of a set of application components and indications of the corresponding blame metrics. The example operations in FIG. 4 are written to apply to either blame metrics of an intra-component anomaly model or a cross-component anomaly model.

A scanner reads in time-series measurements of the specified blame metrics of the identified application component(s) to form a multivariate data slice according to a slice width defined for the pattern described in the known anomaly model for which the scanner was instantiated (402). The slice width defines a number of observations or time instants of the blame metrics to collect for analysis. The scanner can buffer blame metrics measurements until the slice width is satisfied and then populate a P×T matrix (P being the number of blame metrics and T being the number of time instants) with the buffered measurements or populate the matrix with the measurements as read in from the measurement repository (404). The scanner then analyzes the matrix based on the pattern indicated in the known anomaly model (406). The analysis depends upon how the pattern is indicated in the known anomaly model. If the pattern is described with logic that evaluates conditions (e.g., m1 and m2 increase at rate beyond rate change threshold while m3 decreases), then the analysis determines attributes of the blame metric measurements (rates of change, directional changes, flapping, etc.) and compares those attributes against the pattern attributes indicated in the logic/conditions of the known anomaly model. For a logic based model, the anomaly detector may normalize some or all of the blame metric measurements prior to evaluation since magnitude of those measurements may not be relevant to the analysis. If the pattern is indicated in the known anomaly model as a set of functions, then the scanner determines whether the measurements in the matrix fit the set of functions within a specified margin of variance.

Based on the analysis, the scanner determines whether an anomaly pattern has been detected (408). If so, then the scanner generates an event indicating detection of the named anomaly (410). As previously mentioned, the event can also indicate the component(s) and the transaction type. If an anomaly pattern was not detected, then the scanner discards the matrix (412) and proceeds to a next data slice. Embodiments may analyze a sliding window of blame metrics measurements instead of discrete slices. In that case, the scanner continuously updates the matrix or other data structure used to store the blame metrics measurements to insert the blame metrics measurements of a newest time instant and removes those of the oldest time instant.

Figure 5:
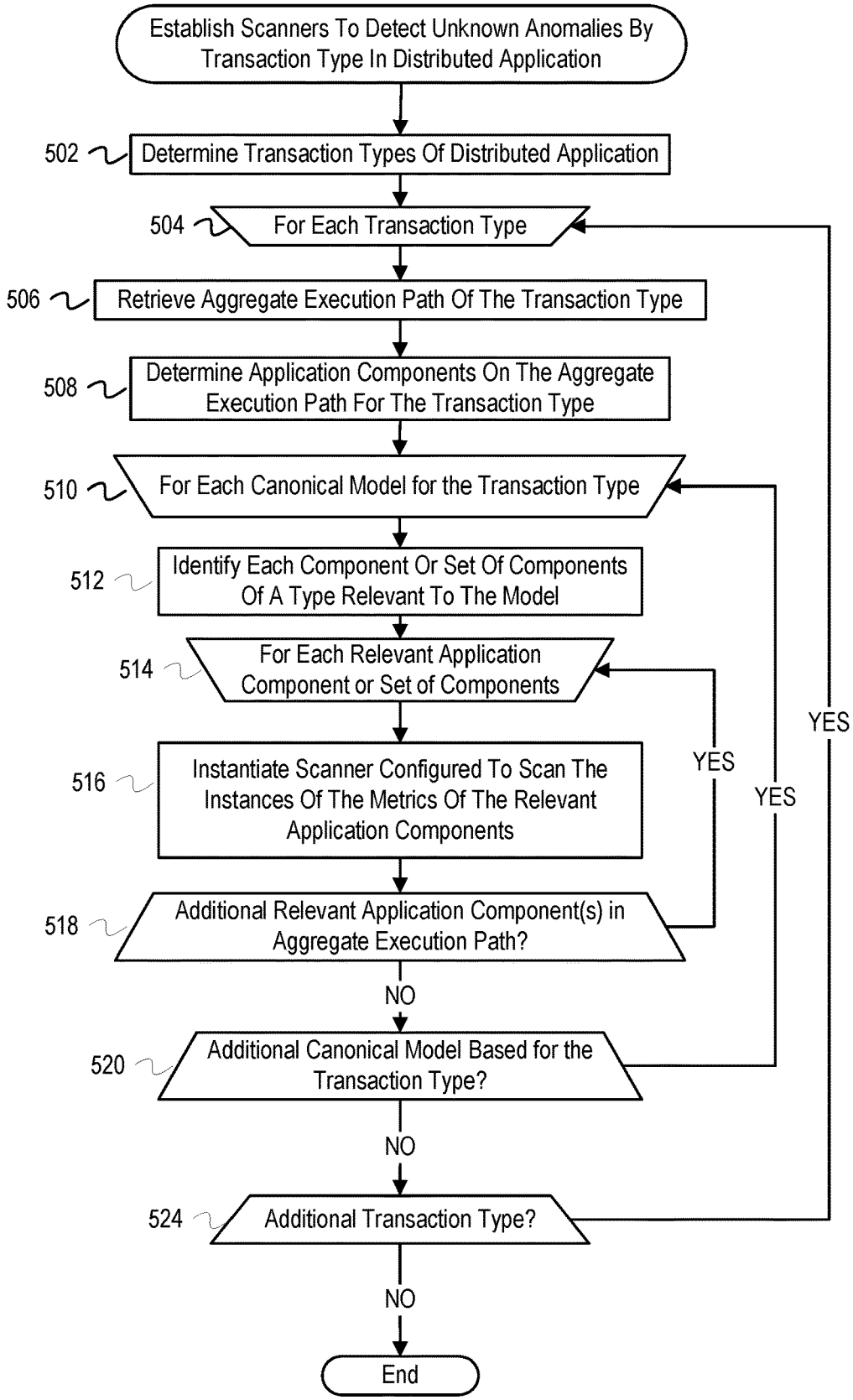
FIG. 5 is a flowchart of example operations for establishing scanners to detect unknown anomalies by transaction type in a distributed application.
Figure 6:
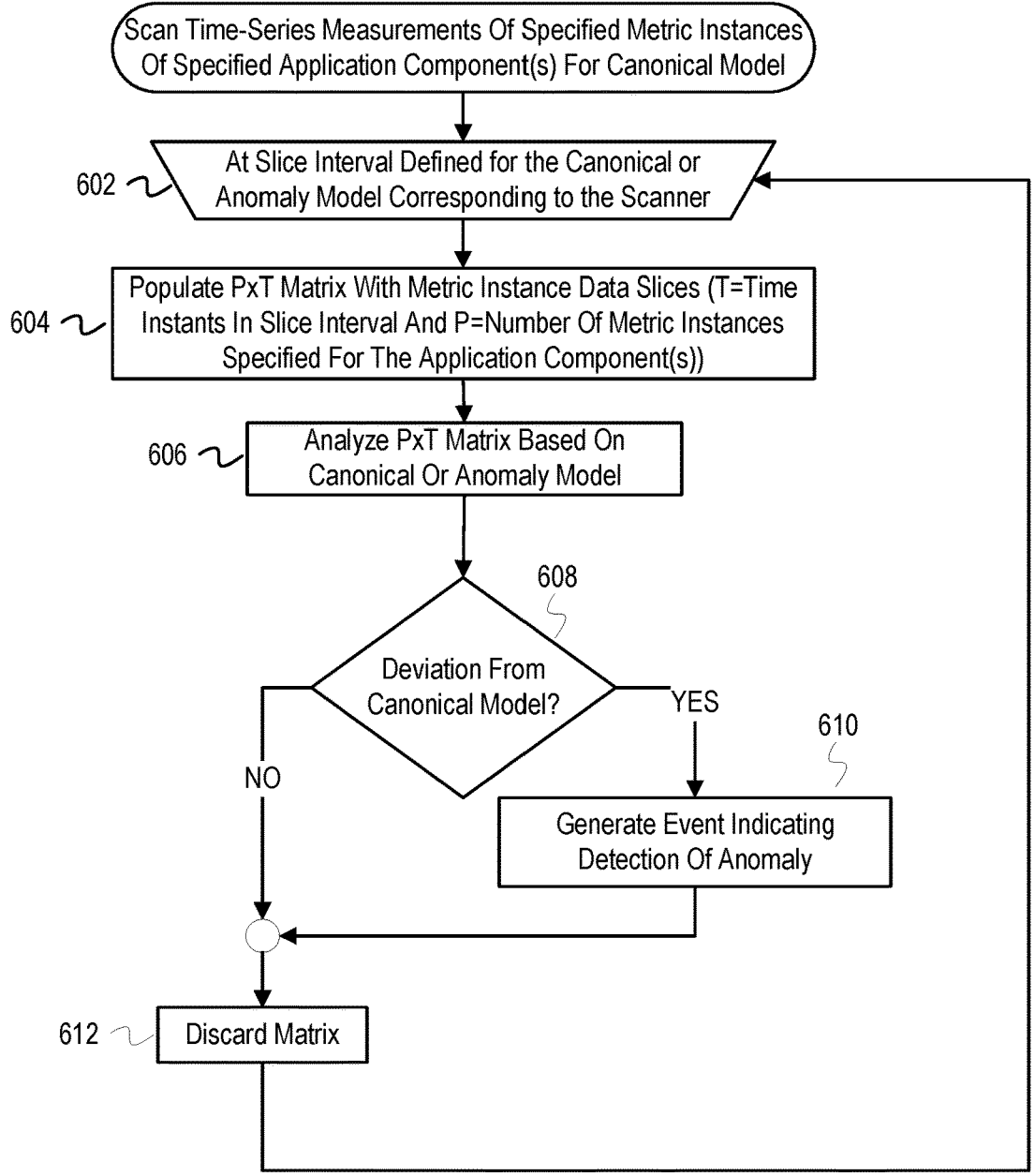
FIG. 6 is a flowchart of example operations for scanning time-series measurements of instances of metrics of a specific application component(s).

The preceding example illustrations have scanned for named anomalies represented by known anomaly models. Embodiments can also scan for unknown/unnamed anomalies by looking for patterns that vary beyond an acceptable margin from a canonical behavior of performance metrics. FIGS. 5-6 present flowcharts of example operations for scanning for unknown anomalies.

FIG. 5 is a flowchart of example operations for establishing scanners to detect unknown anomalies by transaction type in a distributed application. Although there are some similar operations between FIG. 5 and FIG. 2, the example operations in FIG. 5 are analyzing specified metric measurements to detect a pattern(s) of behavior that deviates from a canonical behavior that has been determined for a distributed application.

The anomaly detector determines transaction types of a distributed application associated with the anomaly detector (502). The anomaly detector may query an APM manager to determine transaction types if not already input to the anomaly detector. Since execution paths are dynamic, the anomaly detector can subscribe to receive changes or updated execution paths. Or the anomaly detector can periodically request active execution paths (i.e., execution paths of transactions that have occurred in a recent time window).

For each determined transaction type (504), the anomaly detector gathers information to instantiate appropriate scanners to determine deviation from canonical behavior as represented by one or more sets of metrics. The description refers to a transaction type in a current iteration as a current transaction type. The anomaly detector retrieves an aggregate execution path of the current transaction type (506). As previously mentioned, each instance of the current transaction type can have some variation in execution path. Therefore, the execution paths of multiple instances of a same transaction type can be aggregated into a single execution path. The anomaly detector then determines application components on the aggregate execution path for the current transaction type (508). The execution path includes and/or references information that identifies each component and at least indicates component type.

For each canonical model (510) for the transaction type, the anomaly detector determines relevant components to scan. Although FIG. 2 referred to intra-component anomaly models and cross-component anomaly models, each canonical model referred to in FIG. 5 can be based on behavior of multiple metrics of an individual component or across components. A canonical model can be per component or per transaction type. For instance, a canonical model can describe a pattern of metrics for a component for canonical behavior regardless of transaction type. A canonical model can describe a pattern of metrics for one or multiple components for canonical behavior of the distributed application for a particular transaction type or group of transaction types. The anomaly detector identifies each component in the execution path of the current transaction type that is relevant to the current canonical model (512). Each component in the current transaction type execution path of a same type as that indicated in the current canonical model is determined to be relevant.

For each relevant component in the current transaction type execution path (514), the anomaly detector instantiates a scanner configured to scan the instances of the metrics of the relevant application component (516). The anomaly detector can invoke a subroutine that instantiates a process/thread to read time-series measurements of metrics identified in the current canonical model. The anomaly detector can configure the scanner as previously described in FIG. 2. After instantiation of the configured scanner, the anomaly detector determines whether there is an additional application component in the aggregate execution path of the current transaction type that is relevant to the current canonical model (518). If so, then the anomaly detector proceeds to instantiating the scanner for that relevant component. Otherwise, the anomaly detector determines whether there is an additional canonical model to process (520). If there is not an additional canonical model to process, the anomaly detector proceeds to the next transaction type, if any (524).

FIG. 6 is a flowchart of example operations for scanning time-series measurements of instances of metrics of a specific application component(s). The example operations of FIG. 6 represent the operations performed by a scanner instantiated to determine deviation from a canonical model. The description of FIG. 6 refers to a scanner as performing the example operations. The example operations presume the scanner has been configured or instantiated with an identifier of an application component or identifiers of a set of application components and indications of the corresponding metrics specified in the canonical model(s) for the application components.

A scanner reads in time-series measurements of the specified metrics of the identified application component(s) at a slice width defined for the pattern described in the canonical model for which the scanner was instantiated (602). The scanner can populate a P×T matrix according to various techniques, such as those described with reference to FIG. 4 (604). The scanner then analyzes the matrix based on the pattern indicated in the canonical model (606). The analysis includes a pattern analysis that depends upon how the pattern is indicated in the canonical model. In contrast to FIG. 2, the scanner is analyzing to determine whether the slice of measurements exhibits behavior that deviates from behavior described in the canonical model. As with an anomaly model, the canonical model can describe canonical behavior differently. In one instance, a canonical model can describe canonical behavior with a set of criteria/conditions that are logically evaluated to determine deviation of measurements in a slice from canonical behavior. A canonical model can describe canonical behavior with a pattern correlated with canonical behavior. The pattern can be represented with a set of functions, values generated from MANCOVA, etc. The pattern analysis of the matrix can include determining whether the slice measurements fit, within an acceptable margin, the set of functions; generating covariance analysis values and comparing against covariance analysis values of the canonical model; etc.

Based on the analysis, the scanner determines whether the slice measurements exhibit metric behavior that deviates from the canonical behavior expressed in the canonical model (608). If so, then the scanner generates an event indicating detection of an unknown or unnamed anomaly (610). As previously mentioned, the event can also indicate the component(s) and the transaction type. If an anomaly was not detected, then the scanner discards the matrix (612) and proceeds to a next data slice. Similar to the scanning based on anomaly models, embodiments may analyze a sliding window of metrics measurements instead of discrete slices.

Since the space of metrics that can be chosen for a canonical model is substantially larger than those identified for a named anomaly, the metrics chosen for a canonical model may be arbitrary to an extent (e.g., certain metrics may never express a behavior in aggregate that correlates to a meaningful event). The metrics chosen for a canonical model can be the top x metrics that most commonly occur in anomaly models. The metrics chosen for a canonical model may be those that are not in anomaly models for which scanners have been instantiated. A canonical model generator can be programmed that periodically rotates through different sets of metrics and generates a corresponding canonical model.

FIG. 6 presumes a scanner searching for an unknown anomaly based on a canonical model. An anomaly detector likely compares results of analyzing multivariate data slices against the known anomaly models and the canonical model. If the pattern analysis indicates that a multivariate data slice does not exhibit behavior represented by the canonical model and none of the known anomaly models, then the anomaly detector will indicate that an unknown anomaly has been detected. With respect to FIG. 6, embodiments may not perform the operation represented in block 610. Instead, the anomaly detector would generate an indication that the multivariate data slice exhibits behavior that deviates from the canonical model. If pattern analysis against the known anomaly model(s) does not generate a known/named anomaly event, then the anomaly detector would generate the unknown anomaly event.

In the above example illustrations, models are defined based on knowledge of domain experts. These models can be revised or updated based on machine learning techniques. Models can be revised with supervised machine learning techniques that use a previously observed dataset(s), generated from a lab and/or from deployments, to revise anomaly and/or canonical models. For instance, normalization functions can be modified based on supervised machine learning to adapt to measurements actually observed in a deployment. The machine learning technique utilized can also vary based on model type (e.g., logic based model that normalizes measurements versus a function based model that uses raw measurements). In addition, while a margin/threshold of variance can be a predefined amount (e.g., percentage) in general, per software component type, per hardware component type, etc., it can also be established or revised with a machine learning technique. A model, whether expressing a pattern as conditions and/or functions, can be trained with supervised machine learning that uses test data to establish an acceptable margin of variance. This margin of variance can be further refined/tailored by training the model with a dataset of a deployed, distributed application. Thus, the margin of variance can be static or dynamic.

Example Illustrations of Multivariate Clustering to Detect Known or Unknown Anomalies While anomalies can be detected with pattern detection based on models as described above, multivariate clustering analysis can be employed to detect known and unknown anomalies. An anomaly detector (or other program or service) can establish a cluster(s) for canonical behavior(s) and a cluster(s) for one or more named anomalies. The anomaly detector can be deployed with clusters established based on training datasets that conform to defined models (e.g., laboratory datasets generated based on defined models). The clusters can adapt to deployment specific time-series data with or without knowledge expertise to validate cluster assignments of multivariate data slices. Embodiments can deploy the anomaly detector to initially detect anomalies based on the previously described pattern detection and use the results of that pattern detection to establish one or more known anomaly clusters and one or more canonical clusters. In addition, a tighter margin of variance can be defined for selecting multivariate data slices to establish clusters. The first centroid of each cluster can be based on the first multivariate data slices selected by the anomaly detector for cluster training, or a domain expert can select/define multivariate data slices to calculate centroids for known anomaly clusters and a canonical cluster(s).

Figure 7:
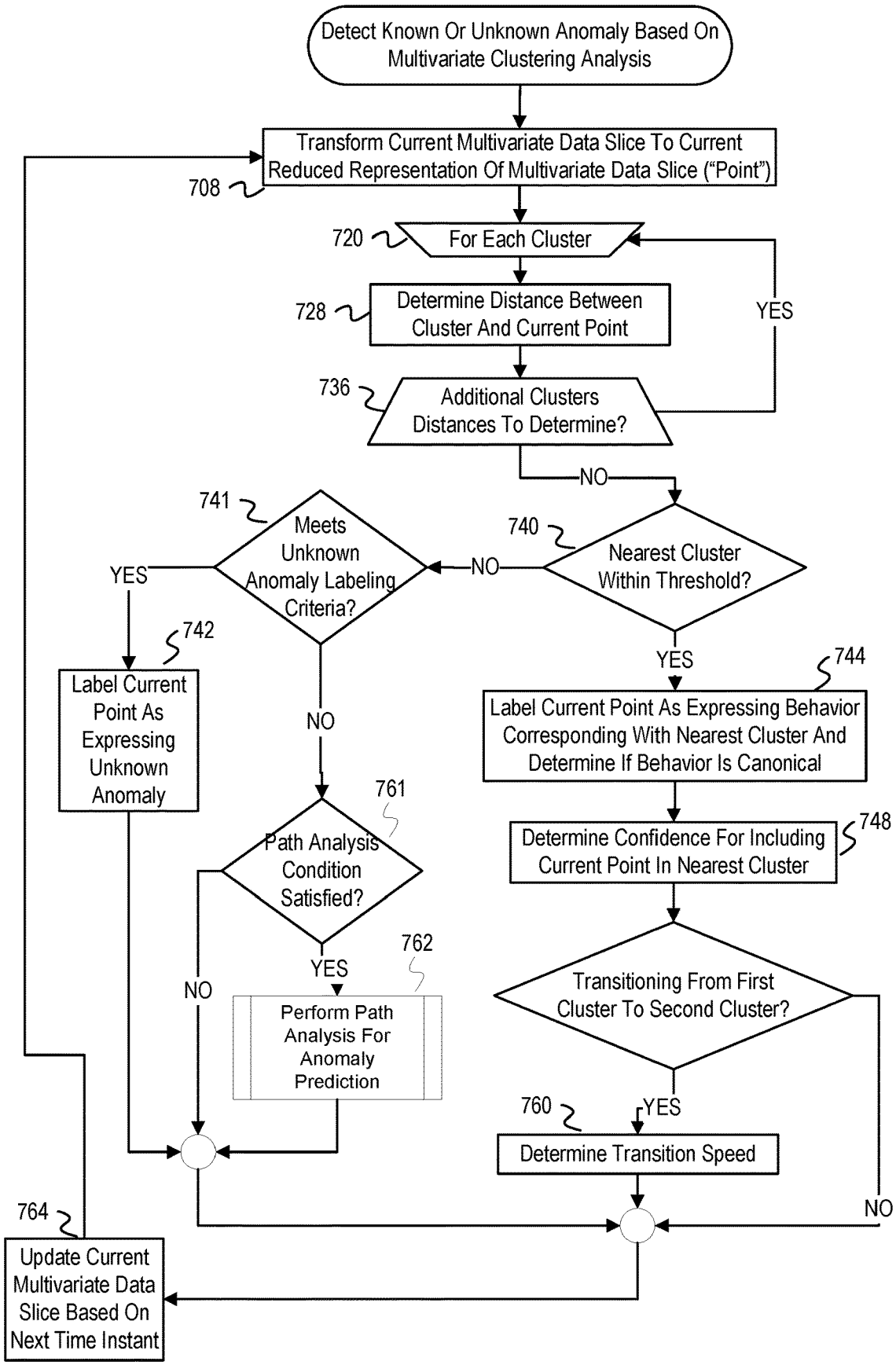
FIG. 7 is a flowchart of example operations for detecting known and unknown anomalies in a distributed application based on multivariate clustering analysis.

FIG. 7 is a flowchart of example operations for detecting known and unknown anomalies in a distributed application based on multivariate clustering analysis. The description of FIG. 7 refers to a scanner as performing the example operations. The description of FIG. 7 also refers to training or updating cluster data based on pattern analysis. However, alternative training or updating methods can be applied.

After forming in a current multivariate data slice, the anomaly detector transforms the multivariate data slice into a current reduced representation of the multivariate data slice (hereinafter referred to as a "point") for cluster analysis (708). The scanner can transform the multivariate data slice using a dimension-reducing method such as principal component analysis (PCA). In PCA, the scanner generates a covariance matrix of the multivariate data slice and determines the eigenvectors of the covariance matrix with their corresponding eigenvalue. The scanner can use the eigenvector with the greatest corresponding eigenvalue (i.e., the principal component) as the point. In addition, the scanner can combine a predetermined number of eigenvectors with the greatest eigenvalues into a combined vector and use the combined vector as the point. Embodiments can generate a reduced representation of a multivariate data slice with multiple dimension reducing operations. For instance, an anomaly detector can rearrange the elements of a multivariate data slice (e.g., by concatenating all the rows of the multivariate data slice into a single vector) and then performing PCA on the rearranged multivariate data slice to generate the point. Alternatively, the scanner can transform the multivariate data slice using singular-value decomposition and use either a left-singular vector or a right-singular vector as the point.

For this example illustration, a cluster(s) has previously been established for canonical behavior, and clusters have been established for named anomalies. These clusters have been established for the feature set (i.e., metrics) for which the scanner has been instantiated. The anomaly detector likely has a scanner for different feature sets. Thus, other canonical and named anomaly clusters will have been established for the other feature sets. For each cluster stored or accessible by the scanner (720), the scanner will determine whether the current point should be assigned to the cluster based on distance. The scanner determines a distance between the current point and the cluster (728). The distance is equal to a Euclidean distance between the current point and a consistent position corresponding to the cluster such as the cluster centroid, the nearest point in the cluster, or a nearest topological boundary of the cluster. For example, the scanner can set the distances to be equal to the Euclidean distances between the current point and each of the cluster centroids. After determining a distance between a cluster and the current point, the scanner determines if there are additional cluster distances to determine (736). If there is an additional cluster distance to determine, the scanner will determine the additional cluster distance. Otherwise, the scanner determines if the nearest cluster is within a threshold distance (740).

The threshold distance can be defined based on the distance between a point in the nearest cluster and the nearest cluster centroid. In some definitions, the threshold distance can change depending on which cluster is the cluster nearest to the current point. For example, if the current point is closest to a first cluster C1 and the greatest distance between a point in the first cluster C1 and the centroid of C1 is the normalized value 0.15, the threshold distance can be set to the intra-cluster distance 0.15. A distance threshold can instead be defined as a ratio of a distance from the centroid of C1 to the furthest distance from the centroid of C1. For example, the threshold distance can be set to be 50% greater than the intra-cluster distance of 0.15, resulting in a threshold distance of 0.225.

If the distance between the current point and the nearest cluster is not within the threshold distance, the scanner determines whether the current point meets an unknown anomaly labeling criterion (741). The scanner can apply various unknown anomaly labeling criteria, such as a time period threshold criterion, an immediate change criterion, and a new cluster criteria. Applying the time period threshold criterion includes determining that the metrics of the current multivariate data slice collectively express an unknown anomalous behavior because 1) the current point cannot be assigned to any named anomaly cluster or a canonical cluster and 2) the scanner has not detected any canonical behaviors or known anomalies for at least a defined time period (also referred to as a time period threshold). For example, if the time period threshold is defined as 5 minutes, and the preceding multivariate data slice derived points within the previous 5 minutes are not part of any cluster, then the scanner determines that the unknown anomaly labeling criterion is met. If the unknown anomaly labeling criterion is met, then the scanner labels the current point as an unknown anomaly and generates an unknown anomaly event. Labeling a point can include associating an unknown anomaly tag with the point and adding the point to a data structure. Labeling a point can also include tagging a multivariate data slice with the unknown anomaly tag and storing the multivariate data slice in a separate data structure. The time period threshold can be any value greater than zero. The time period threshold is likely a multiple of the slice width. Applying the immediate change criterion is similar to applying the time period threshold criterion, except that the scanner immediately labels the current point as an unknown anomaly if the scanner has not detected any canonical behaviors or known anomalies without considering preceding multivariate data slice derived points.

Alternatively, or in addition, the scanner can apply new cluster criteria and determine that the current multivariate data slice is expressing behavior corresponding with an unknown anomaly when the current point forms a new cluster with previous outlier points. The scanner can establish the new cluster corresponding to an unknown anomaly ("unknown anomaly cluster") based on the parameters used to train and update clusters of the anomaly and canonical models. For example, a new cluster can be defined as a set of points having at least n points, each within a pre-established maximum distance of each other and outside of a defined maximum distance of the already established clusters. If a cluster for canonical behavior is the only established cluster, and if n points are outside of the defined maximum distance of the cluster for canonical behavior, and if each point of then points are within a pre-established maximum distance of each other, then the scanner establishes a new unknown anomaly cluster from the n points. After the new cluster has been established as representing an unknown anomaly, a notification can be generated to investigate the cluster members and subsequent cluster analysis will include the established unknown anomaly cluster (i.e., the determination of distance (728) will include the unknown anomaly cluster). In the case of multiple unknown anomaly clusters, the anomaly detector will generate and assign distinguishing identifiers for the unknown anomaly clusters.

If the scanner determines that the current point meets the unknown anomaly labeling criteria, the scanner labels the current point as expressing an unknown anomaly (742). As described above, this "labeling" can involve different operations. For example, the labeling may be associating an unknown anomaly tag or indicator with the current point and/or corresponding multivariate data slice. If the anomaly detector is establishing unknown anomaly clusters, then the labeling can also include creation of the unknown anomaly cluster and assignment of the current point and previous qualifying points to the unknown anomaly cluster. If the current point does not meet the unknown anomaly labeling criteria, then the scanner determines whether a path analysis condition(s) has been satisfied (761). A path analysis condition can be set based on current and/or historical state of the distributed application, a historical window of multivariate data slices, etc. For instance, a condition can be that the current point is the nth point in the last n points that have not been associated with a cluster. The value for n can be a number programmatically defined or a configuration of the scanner to invoke path analysis code. Embodiments can dynamically adjust this value.

If the scanner determines that the path analysis condition is satisfied, then the scanner invokes program code to perform path analysis for anomaly prediction (762). The scanner can be programmed to perform the path analysis, but this example presumes a separate subroutine or service performs the path analysis. Example operations for the path analysis are described in FIG. 9. If the scanner determines that the path analysis condition is not satisfied or after invocation of the path analysis, the scanner updates the current multivariate data slice with measurements of a next time instant (764). The measurements of the feature set being monitored by the scanner should be read in or arrive at a rate that allows for consumption by the scanner. For instance, after completion of the cluster analysis, measurements of the next time instant are available for the scanner to read into the multivariate data slice data structure and push out the oldest time instant from the structure. As mentioned previously, implementations can coordinate the rate of retrieval/collection of monitored feature set measurements with analysis differently (e.g., creating the multivariate data slices based on the sliding slice width window asynchronously with the multivariate clustering analysis).

If the anomaly detector determines that the distance between the current point and the nearest cluster is within the threshold distance (740), the scanner labels the current point as expressing the behavior corresponding with the nearest cluster and determines if the behavior is a canonical behavior (744). For example, if the current point is nearest to a cluster labeled as "memory leak," the scanner labels the current point as expressing the known anomaly "memory leak." Because memory leak is not a canonical behavior, the scanner determines that the behavior is not canonical. As described above with reference to FIG. 6, the scanner generates an event indicating the detection of a memory leak anomaly. In addition, the scanner can update the cluster corresponding with the canonical/anomaly model to include the current point and determine a confidence for the inclusion.

After labeling the current point, the scanner determines a confidence for including the current point in the nearest cluster (748). The confidence can be calculated using various methods. One method is based on the distances between the current point and the nearest clusters. For example, when the distance between a current point and the nearest cluster $C_1$ is $d_1$ and the distance between a current point and the second-nearest cluster $C_2$ is $d_2$, the normalized confidence that the point is correctly included in the cluster $C_1$ is Confidence($C_1$), and can be determined as follows in Equation 1:

$$\text{Confidence }(C_1) = \frac{|d_1 - d_2|}{\max(d_1, d_2)} \quad (1)$$

After determining the behavior of the distributed application based on the current point, the scanner also determines whether the application behavior is transitioning from a first cluster to a second cluster (752). The system can determine that a cluster transition occurs if a past point was a part of a first cluster and a current point is both no longer part of the first cluster and is closer to a second cluster based on their respective distances from the current point. If not, the scanner does not determine a transition speed. Otherwise, the scanner determines a transition speed (760). The transition speed is determined based on a ratio between the distance traveled by the current point relative to the position of a point at a previous time instant. For example, if a current point has a distance of 0.60 normalized units from the preceding point (i.e., the interpoint distance is 0.60 normalized units) and the preceding point was measured at a time of 10 second before the current point, the transition speed is 0.06 normalized units/second. If an anomaly event is generated (i.e., the point has been assigned to a cluster representing an anomaly), then the transition speed can be included in the anomaly event. The transition speed can be used in root cause analysis of a corresponding anomaly. The transition speed may also be used for other analysis such as predicting when the behavior of the distributed application will be expressing behavior corresponding with the second cluster. For example, if a current point is moving at 0.06 normalized units/second towards a boundary of a cluster labeled with "memory leak" that 0.6 normalized units away, the scanner can generate an approximate prediction event that the distributed application is 10 seconds away from expressing the known anomaly "memory leak." The transition speed can also be used to increase the accuracy of the of prediction events described further below with reference to FIG. 9.

Once the scanner has determined whether or not to label the current point as expressing the known behavior or an unknown anomaly, the scanner trains or updates the clustering analysis based on the current point. Training or updating the clustering analysis includes storing the current point into a history of points, forming new clusters based on the history of points, and labeling clusters based on known behaviors. The history of points includes some or all of the points transformed by the scanner. The scanner can process the history of points to determine if a new cluster should be formed. If the scanner first forms a new cluster, the scanner correlates the cluster to a canonical behavior or a known anomaly based on the result of the pattern analysis described above with reference to FIG. 6. For example, a scanner forming a new cluster can analyze the measurement times of the points in the new cluster and determine if they correspond with any canonical or anomaly models reported by the pattern analysis. Furthermore, alternative cluster labeling methods are described below with reference to FIG. 9. If the new cluster correlates with a known behavior, the new cluster is labeled as expressing the known behavior. In addition, the scanner can update a cluster for canonical behavior or known anomalies by adding the current point to the cluster. The scanner can update the centroid position of the cluster to account for the changes to the cluster centroid caused by the added point.

Figure 8:
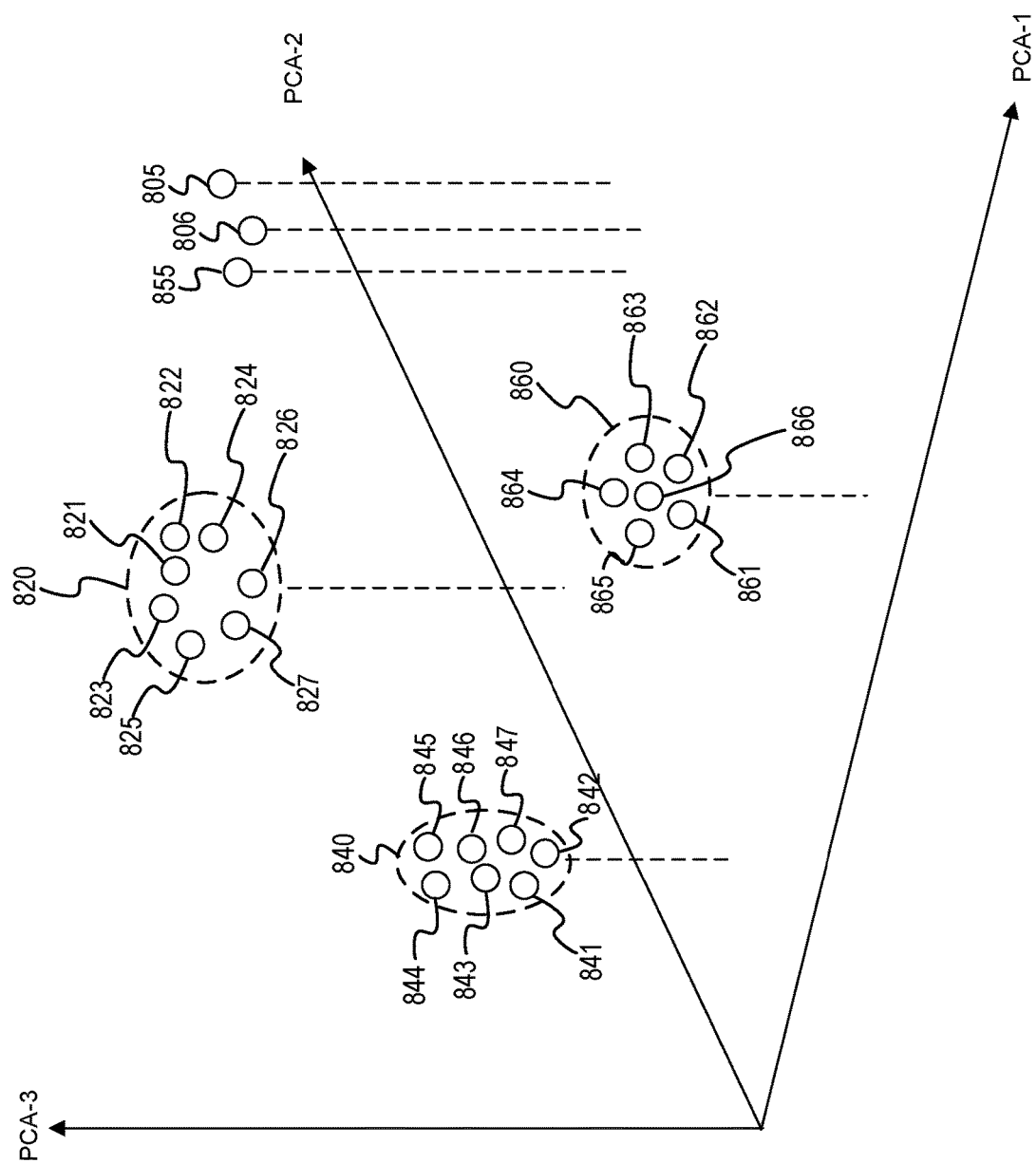
FIG. 8 is a visualization of cluster detection for points from a distributed application.

FIG. 8 is a visualization of cluster detection for points from a distributed application. Each of the points 821-827, 841-847, 855, and 861-866 in FIG. 8 represents a particular point having a position determined by the elements of a principal component of a multivariate data slice, and the axes of the plot in FIG. 8 are PCA axes. The principal components are based on multivariate data slices. For example, the principal components can be based on multivariate data slices that include the application related metrics "InitiationA.AvgRespT," "PurchaseNode.AvgRespT," and "DB1.ErrPerIntvl." The points 821-827 are part of the cluster 820. The points 841-847 are part of the cluster 840. The points 861-866 are part of the cluster 860. In addition, the points 805, 806, and 855 are not a part of clusters 820, 840, or 860. Each of the points in the figure can be collectively analyzed using various clustering algorithms (K-means, Fuzzy-C means, Hierarchical, etc.).

The clusters can be labeled based on a comparison with pattern analysis results. For example, points in the cluster 820 correspond with pattern analysis results that report the metrics of the points as expressing canonical behavior. In response, the cluster 820 is labeled with a label indicating "canonical behavior." Alternatively, the cluster can be labeled based on one or more points in a history of labeled points. Each point in a cluster storing the labeled points can be assigned the same label. These labeled points can be used to label the entire cluster. For example, each of the points 845-846 and 865-866 are loaded upon initialization of the scanner and respectively labeled as expressing the known anomalies "memory leak" and "death by a thousand cuts." These names enable the scanner to intelligently label each of the clusters 840 and 860 with their respective names of "memory leak" and "death by a thousand cuts."

When a current point is generated based on a current multivariate data slice, it is added to the set of points for cluster analysis. If the scanner determines that distance of a newly-generated point from the nearest cluster is within a distance threshold, then the scanner determines that the newly-generated point is a part of the cluster. Based on this determination, the application behavior corresponding with the cluster is associated with the time/time period of the newly-generated point. For example, if the point 827 is the current point and the scanner determines that the distance between the point 827 and the cluster 820 is within a threshold distance, the scanner will determine that the current point 827 is part of the cluster 820. In response, the scanner determines that the current point 827 is part of the cluster 820 and that the current behavior is the behavior expressed by the cluster 820. For example, if the cluster 820 is labeled with the anomaly name "memory leak," then the scanner determines that the distributed application is expressing behavior correlated with a memory leak.

With reference to FIG. 7 described above, the scanner can apply the time period threshold criterion as a unknown anomaly labeling criterion to detect an unknown anomaly. For example, if the point 806 is the current point, the scanner determines that the distances between the current point 806 and each of the clusters 820, 840, and 860 are beyond a distance threshold and thus the scanner has not detected any canonical behaviors or known anomalies for the time instant corresponding to the current point. The scanner also determines that the distance between the current point 805 and each of the clusters 820, 840, and 860 are beyond the distance threshold and thus has not detected any canonical behaviors or known anomalies for the time instant corresponding to the point 805. If the time period threshold is 5 minutes, and if the point 805 is the only preceding multivariate data slice derived point within the previous 5 minutes, then the scanner determines the point 806 is not in any cluster and that the unknown anomaly labeling criterion is met. In response, the scanner labels the point 806 as expressing an unknown anomaly and generates an unknown anomaly event.

With continued reference to FIG. 7, an unknown anomaly can be detected when a current point is part of a new cluster if the scanner applies the new cluster criteria described above for the unknown anomaly labeling criteria. For example, if new clusters are defined as a set of points having at least three points within a pre-established distance from each other, and if the points 805, 806, and 855 are each outside of a defined maximum distance of the already established clusters, then the scanner combines the points 805, 806, and 855 to establish a new cluster including the three points as an unknown anomaly cluster. After the new cluster is established, the scanner generates a notification to investigate the cluster members.

Path-Based Anomaly Prediction

Figure 9:
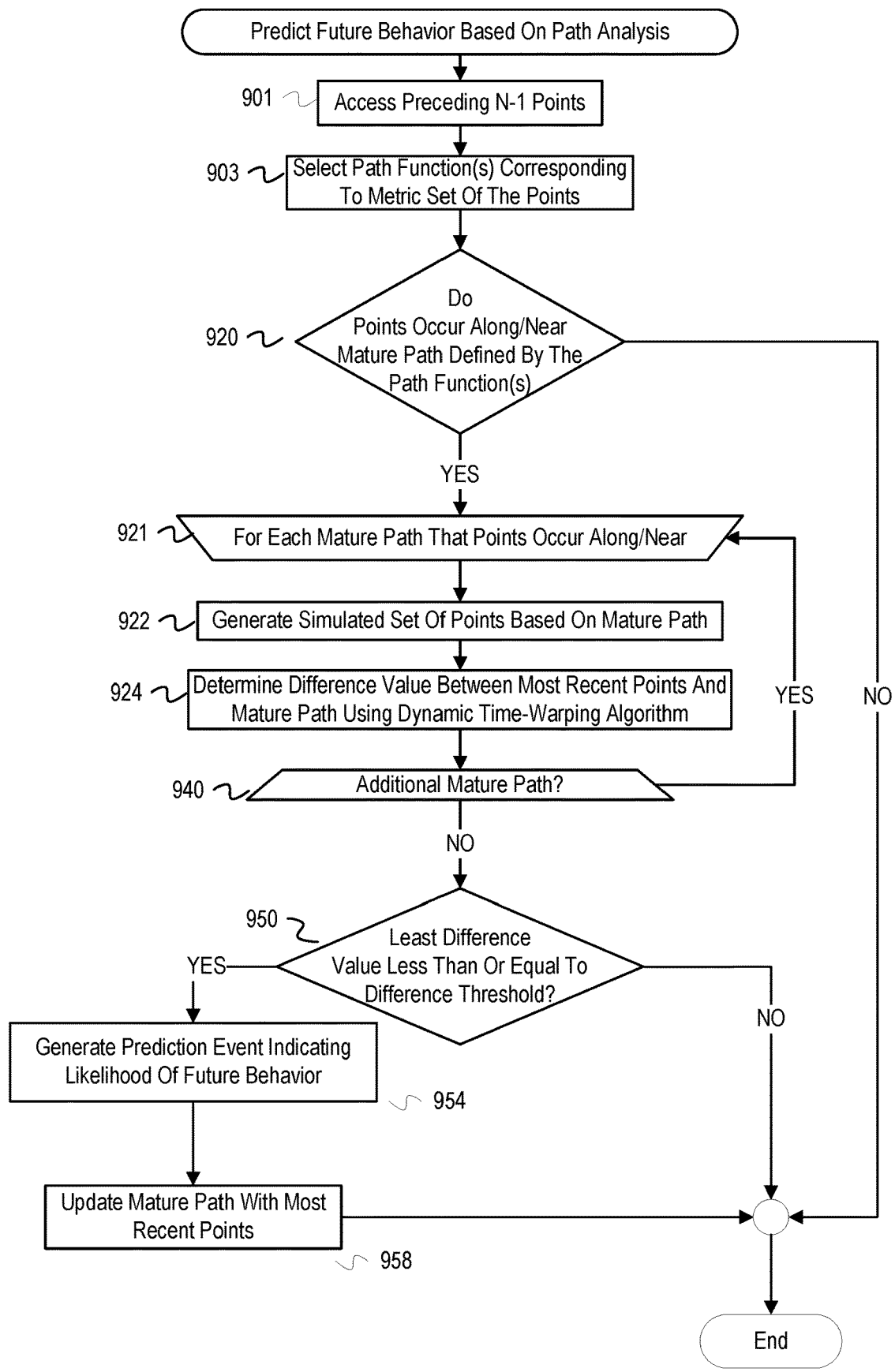
FIG. 9 illustrates a flowchart of example operations to predict a future anomalies based on paths.

FIG. 9 illustrates a flowchart of example operations to predict a future anomaly based on paths. The description of FIG. 9 refers to the anomaly detector as performing the example operations. For this illustration, it is presumed that the anomaly detector begins performing a path analysis when a scanner determines that a path analysis condition(s) is met, which at least involves a minimum number (n) of points in series not being within a cluster. The minimum number n is a minimum number of points that can be analyzed to determine whether those points lie along a path or within a region defined by the path. For instance, a single point could not be analyzed but two or more can.

Since path analysis is to be performed, the anomaly detector reads or retrieves the n−1 points preceding a current point (901). The trajectory analysis analyzes a current point as well as historical points preceding in series the current point. The anomaly detector will mark or store for retrieval the n−1 most recent points (or corresponding multivariate data slices) that were not part of a cluster for the path analysis. The anomaly detector will mark or store these points for each metric set being scanned by the scanners to be available for the analysis. For example, the anomaly detector can maintain a queue of historical points for each metric set being monitored by the scanners. There can also be a difference between the number of points analyzed and the number of points that satisfy the path analysis condition and a subset of that series can be chosen for analysis. For example, if a anomaly detector detects that the L most recent points have not been included in a cluster, then the anomaly detector collects the K most recent points from the history of points. For a metric set/scanner, the anomaly detector can maintain a queue with L entries for the points and select any K of those L entries. The anomaly detector can also maintain information that maps the points back to the corresponding multivariate data slice (e.g., time identifier and metric set identifier) assuming the historical multivariate data slices are not also stored/marked. The mapping can be used to retrieve information from the multivariate data slice that may be populate a prediction event.

The anomaly detector selects a set of functions, each function defining a time-dependent multidimensional curve ("path functions") (903). The anomaly detector selects the set of functions that corresponds to the metric set that is the basis for the retrieved points. Presuming at least one path has already been established for each metric set or scanner, the anomaly detector would select the path function(s) that defines the at least one path traveled by points, which were generated by dimensionally reducing multivariate data slices collected for the metric set.

After selection of the one or more path functions, the anomaly detector determines whether the set of accessed points fit the curve defined by the path function or fall within a space (e.g., region or volume) defined by the path function (920). In the case of multiple mature paths having been established for a distributed application, the anomaly detector may determine that the set of points occur along or near multiple mature function paths. For example, the path can be a linear combination of time-dependent multivariate polynomials that define a curve which begins at a starting cluster and ends at a destination cluster. Each increment in time corresponds with a predicted position on the path that is further from the starting cluster and closer to the destination cluster along the path. A path overlaps with a cluster when the path includes at least one segment such that a point on the segment would be assigned to the cluster. The path functions can be stored in a path library organized by metric set and/or scanner, and that includes both paths that have met reliability criteria ("mature paths") and paths that have not met the reliability criteria ("immature paths"). A set of points occurs along or near a path when a distance between at least one of the points and the path is less than a path range threshold. For example, if the minimum distance between a point from the K most recent points is 1.25 units and the path range threshold is 2 units, the K most recent points occur along or near the path. If the set of points did not occur along or near a mature path(s), then path analysis based on the current point ends. If the set of points occurred along or near a mature path(s), then the anomaly detector analyzes the set of points against each of the mature paths (921).

For each mature path that the set of points occur along or near, the anomaly detector generates a simulated set of points based on the mature path (922). For example, each of the time instants corresponding with each of the most recent K points can be normalized and/or extended before being used as an input for the mature path to generate a simulated set of points corresponding with the normalized time instants. The anomaly detector then determines a difference value between the most recent points and the mature path using a dynamic time-warping (DTW) algorithm (924). The difference value is a quantitative assessment of the difference between the most recent points and the simulated set of points. When using the DTW algorithm, the anomaly detector determines an optimal match using a tunable window size and also determines a corresponding cost function between the simulated points and the most recent points. The calculated cost from the cost function of the DTW algorithm can be directly used as the difference value or can be first normalized and/or otherwise modified before being used as the difference value.

After determining the difference value between the most recent points and the mature path, the anomaly detector determines if there is an additional mature path that the set of points occur along or near (940). If so, the anomaly detector proceeds with analyzing the points against the additional mature path.

Otherwise, the anomaly detector determines if the least difference value is less than or equal to a difference threshold (50). The anomaly detector has cached or stored the difference values calculated between the set of points and each of the mature paths that the set of points were determined to occur along or near. The anomaly detector selects the least of these computed different values and compares it against a threshold for choosing a mature path function. If the least difference value is greater than the difference threshold, then the anomaly detector does not generate a prediction event indicating a future behavior corresponding with a cluster.

Otherwise, the anomaly detector generates a prediction event indicating a likelihood of occurrence of a future behavior (e.g., a future known anomaly) corresponding with the metric set (954). The anomaly detector can generate the prediction event with an estimated time before the future behavior is expressed by the distributed application and a corresponding confidence value. The time until the future behavior is first expressed can be calculated based on one or more transition speeds between consecutive points. For example, if the average transition speed along a path is determined to be 50 unit/minute based on one or more transition speeds between consecutive points, and the path is 1000 units long between the position of a current point and a cluster boundary, the anomaly detector can predict that the distributed application will express the future behavior corresponding with the destination cluster in 20 minutes. The prediction event can indicate multiple future behaviors, which can include any combination of future anomalies or future canonical behaviors.

The confidence value can be based in part on the number of paths that lead to a same cluster or a different cluster. Multiple confidence values can be calculated for a single prediction event, such as a confidence for a future behavior and a confidence for a time before the future behavior is expressed. For example, the confidence value for a future behavior can be determined as a normalized summation, wherein each overlapping path is weighted by the inverse of its difference value and adds to the confidence value if a respective overlapping path leads to the future behavior and subtracts from the confidence value otherwise. For instance, if three mature paths each predict the same future behavior based on the same most recent points, the confidence value is greater than if the three mature paths each predicted different future behaviors. The confidence value for a predicted time before the future behavior is first expressed can be inversely correlated with a variance of the predicted times of all paths having a difference value less than the difference threshold. For example, if each of three mature paths with difference values less than the difference threshold predict a future behavior of "stall" but have predicted times of 4 minutes, 6 minutes, and 80 minutes, the prediction event can indicate a confidence value of 97% with regards to the future behavior and a confidence value of 21% with regards to a predicted time of 30 minutes.

Once the prediction event is generated, the mature path is updated with the points used in the path analysis (958). Updating the path can include storing the points into a path support dataset that includes previous sets of points and re-generating the path based on the path support dataset. For example, if a dataset included 20 previous sets of points and the K most recent points are added to the dataset, the updated dataset includes 21 sets of points and the path is re-generated by minimizing a cost function across the 21 sets of points. Generating (or establishing) a path is described further below with reference to FIG. 13.

Figure 10:
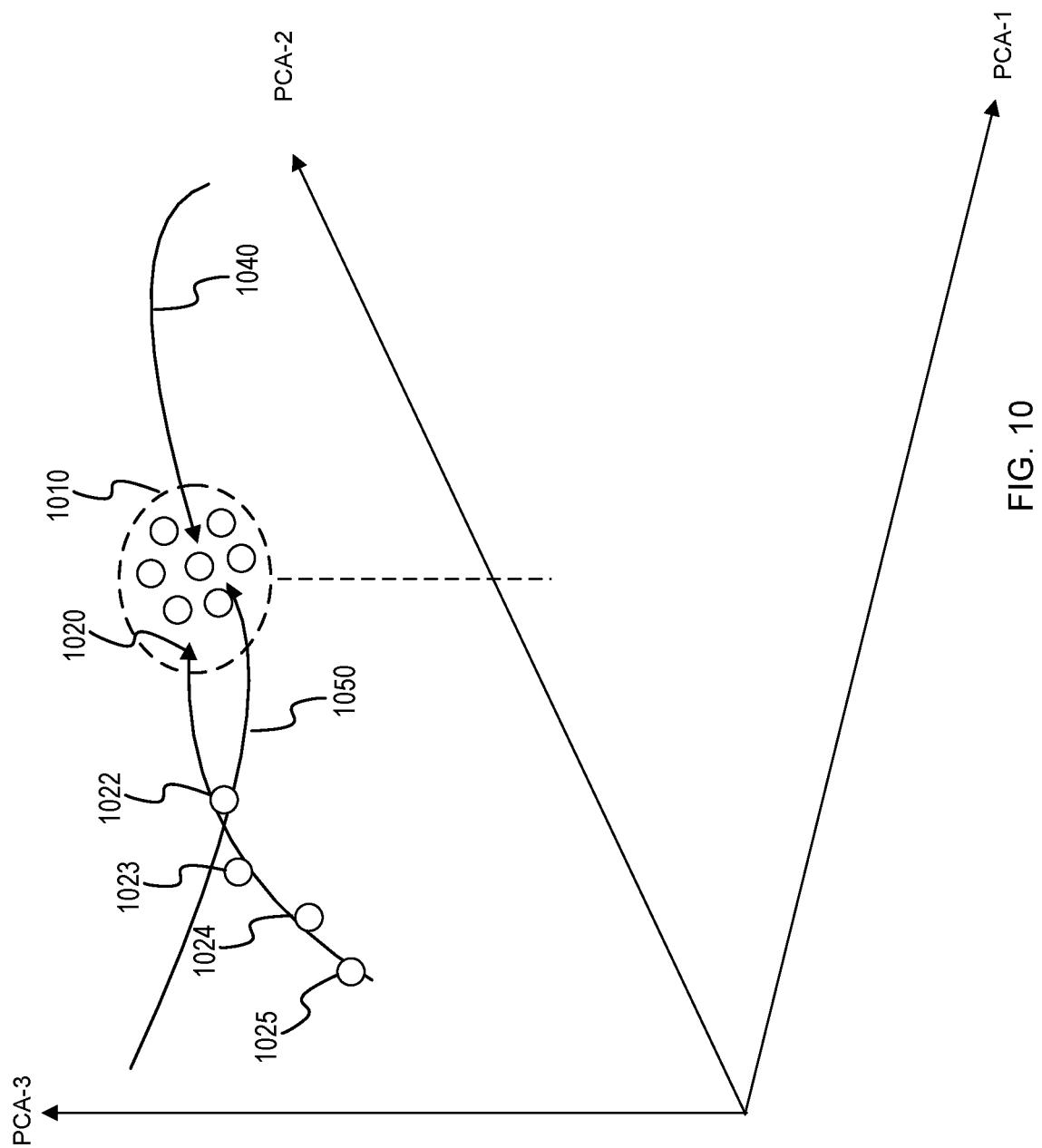
FIG. 10 is a visualization of a path analysis to generate a prediction event for a future anomaly in a distributed application.
Figure 11:
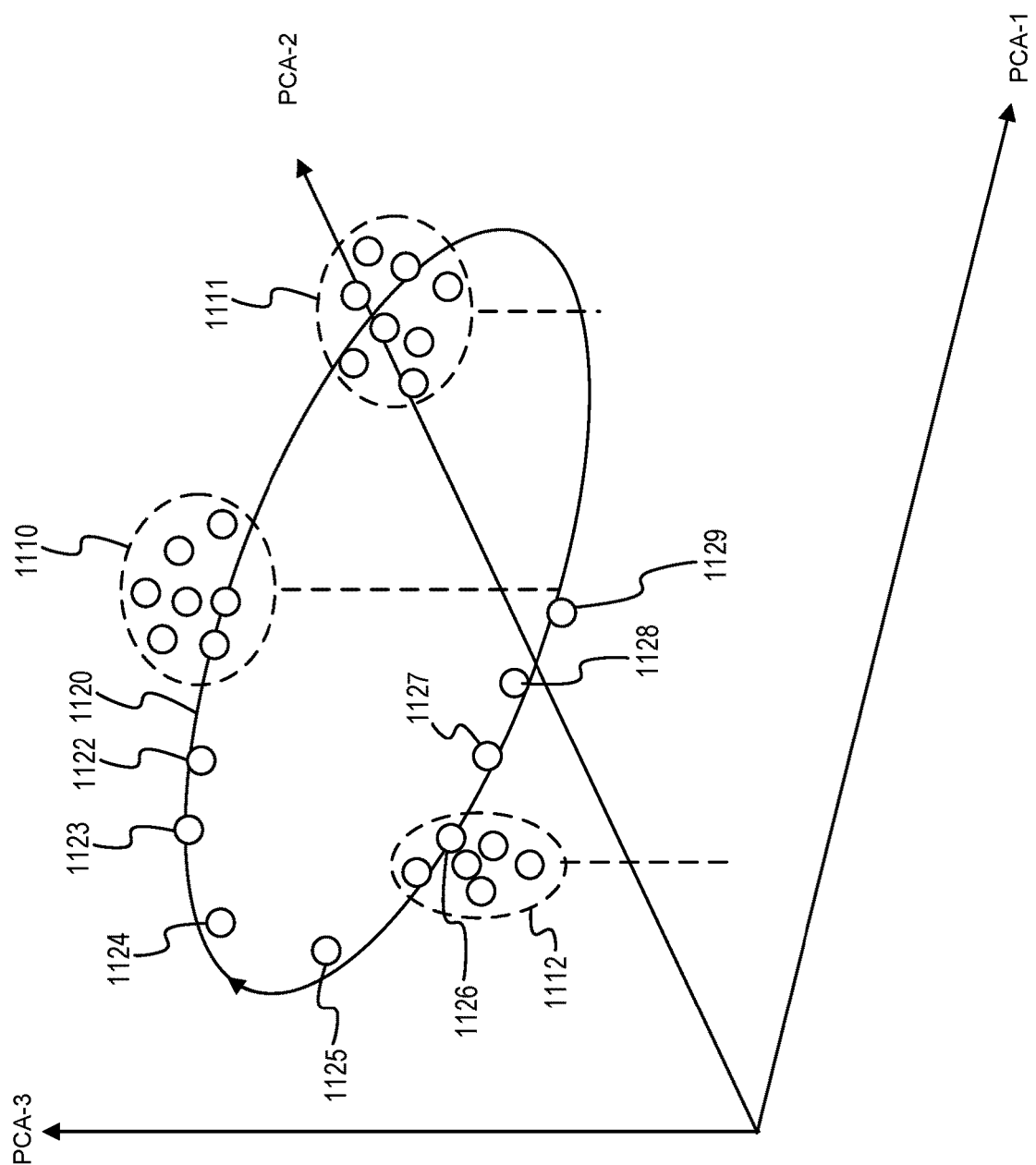
FIG. 11 is a visualization of a path analysis using a path that cycles between three clusters to generate a prediction event for future behaviors in a distributed application.

FIGS. 10 and 11 are diagrams that visualize different paths that can be discovered for anomaly prediction. FIG. 10 is a visualization of a path analysis to generate a prediction event for a future anomaly in a distributed application. Each of the points 1022-1025 in FIG. 10 represents a point having a position determined by the elements of a principal component of a multivariate data slice, and the axes of the plot in FIG. 10 are PCA axes. In this example, the four most recent points include the point 1022 as the current point and the points 1023-1025. The point 1023 is the most recent previous point, the point 1024 is the second-most recent previous point, and the point 1025 is the third-most recent previous point. The cluster 1110 corresponds with the known anomaly "memory leak" and can be determined using various methods, such as those disclosed in the description for FIG. 8.

After detecting that the current point and the most recent point (i.e., the points 1022 and 1023) are not included in any cluster, the anomaly detector collects the two additional preceding points. The anomaly detector then compares these four most recent points to each mature path in a path library, which includes the path 1020, path 1040, and path 1050. The anomaly detector first determines that the paths 1020 and 1050 both include a region that overlaps with the current point (i.e., the point 1022 occur near the path 1020 and the path 1050). The anomaly detector generates simulated sets of points for the paths 1020 and 1050 and implements a DTW algorithm to compare each simulated set of points with the four most recent points to generate difference values. Based on the results of the DTW algorithm, the anomaly detector determines that the path 1020 is least different from the four most recent points. In this example, the anomaly detector determines that the difference value of 0.26 units is less than the difference threshold of 1.20 units. In response, the anomaly detector generates a prediction event indicating a future behavior corresponding with the cluster 1010, an estimated time of 20 minutes before the future behavior is expressed, and a corresponding confidence value of 77%. The prediction event is then provided to an APM manager for consumption.

FIG. 11 is a visualization of a path analysis using a path that cycles between three clusters to generate a prediction for future behaviors in a distributed application. Each of the points 1122-1129 represents a particular point having a position determined by the elements of a principal component of a multivariate data slice, and the axes of the plot in FIG. 11 are PCA axes. In this example, the point 1122 is the current point, and each of the points 1123-1129 are the most recent previous points in listed reverse chronological order (e.g., the point 1123 is the most recent previous point, the point 1124 is the second-most recent previous point, etc.). Collectively, the points 1122-1129 are the eight most recent points. The cluster 1110 corresponds with the known anomaly "memory leak," the cluster 1111 corresponds with an unknown anomaly, and the cluster 1112 corresponds with canonical behavior.

In this instance, the anomaly detector performs a path analysis after determining that the points 1122-1125 have each not been part of any cluster. During the path analysis, the anomaly detector collects the eight most recent points, which includes the current point 1122 along with the most recent previous points 1123-1129. In addition, the anomaly detector accesses each mature path in a path library that includes the mature ellipse path 1120. The mature ellipse path 1120 cycles from the cluster 1110 to the cluster 1111, from the cluster 1111 to the cluster 1112, and from the cluster 1112 back to the cluster 1110. The anomaly detector determines that the mature ellipse path 1120 includes a region that overlaps with the eight most recent points. The anomaly detector generates a simulated set of points based on the mature ellipse path 1120 and the time instants corresponding with the eight most recent points. The anomaly detector then determines a difference value using the DTW algorithm described above with reference to FIG. 9.

In this example, the anomaly detector determines that the difference value between the mature ellipse path 1120 and the eight most recent points is of 1.10 units. If the difference threshold is 1.15 units, the difference value is less than the difference threshold. In response, the anomaly detector generates a prediction event indicating that the memory leak corresponding with the cluster 1110 will be expressed first, the unknown anomaly corresponding with the cluster 1111 will be expressed second, and the canonical behavior corresponding with the cluster 1112 will be expressed third. The prediction also indicates predicted times of 20 minutes, 40 minutes, and 130 minutes for the memory leak, unknown anomaly, and canonical behavior to be expressed by the distributed application, respectively. The anomaly detector also indicates confidence values of 94%, 78%, and 62% for each predicted future behavior. In addition, the anomaly detector can detect that the mature ellipse path 1120 is a closed curve and thus may continue to switch between different clusters. In response, the prediction event can also indicate that the distributed application will continue to switch between different behaviors.

Figure 12:
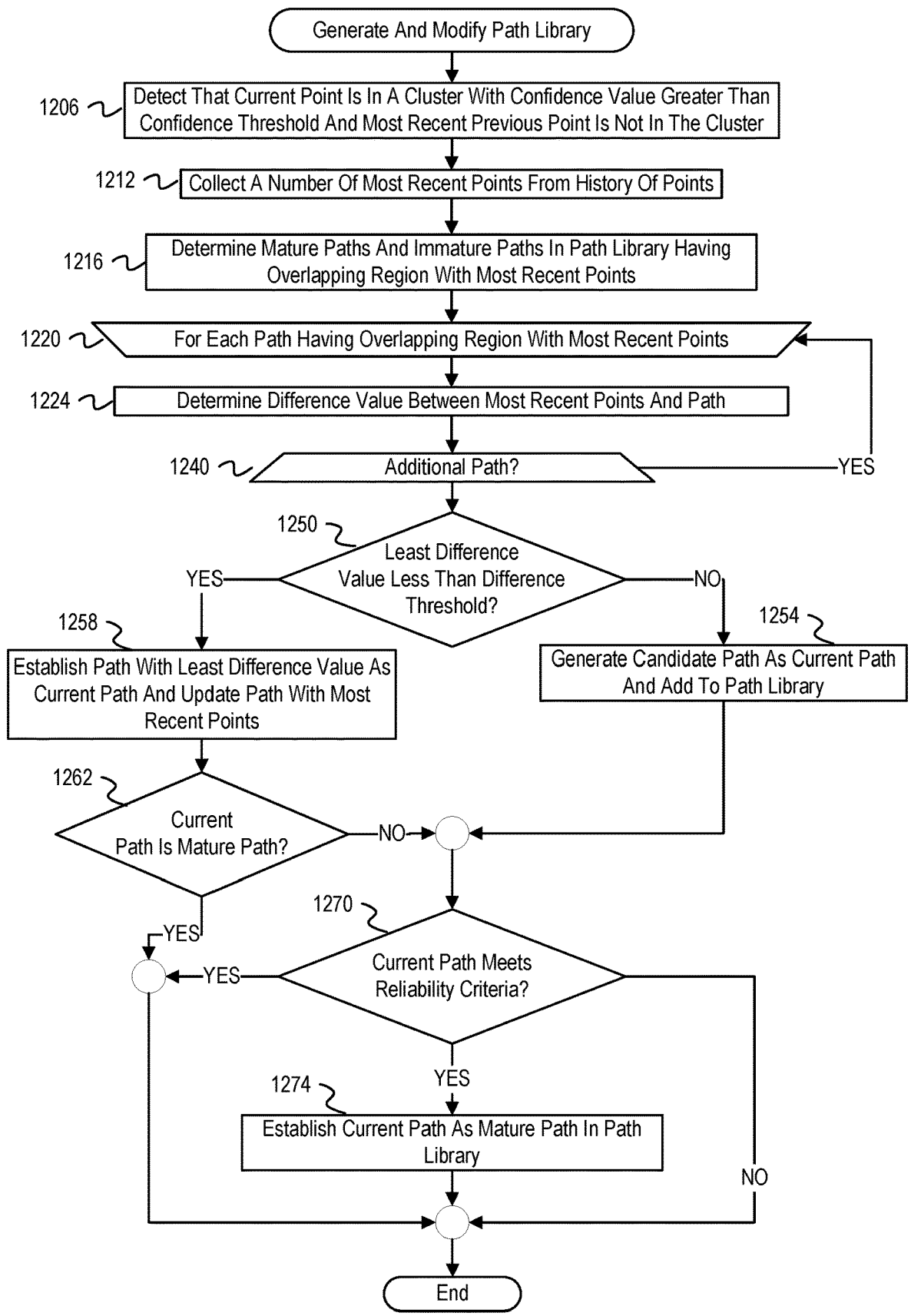
FIG. 12 illustrates a flowchart of example operations to generate or modify a path library using path library modification operations.

FIG. 12 illustrates a flowchart of example operations to generate or modify a path library using path library modification operations. The description of FIG. 12 refers to a scanner as performing the example operations. The example operations of FIG. 12 represent the operations performed by instantiated scanners and can be performed either before or in coordination with the operations described above with reference to FIG. 9. The example operations presume the scanner has already generated a set of points corresponding to multivariate data of a feature set selected based on the topology of a distributed application and stored the points in a history of points.

The scanner initializes path library modification operations when a path library modification condition(s) is satisfied. In this example, the path library modification condition is that the scanner detects that a current point is included in a cluster with a confidence value greater than a confidence threshold and that at least one of the most recent points is not included in the cluster (1206). After the scanner detects that a current point is included in a cluster with a confidence value greater than the confidence threshold and that the most recent previous point is not included in the cluster, the scanner collects a number of the most recent points from a history of points (1212). For example, if a scanner detects that the current point is included in a cluster with a confidence greater than the confidence threshold of 90% and the most recent previous point is not included in the cluster, then the scanner collects the K most recent points from the history of points. The scanner then determines each of the mature paths and immature paths in the path library having an overlapping region with the current point (1216).

For each path having an overlapping region with the most recent points (1220), the scanner determines a difference value between the most recent points and the path (1224). The difference value can be determined by first generating a simulated set of points based on the path and then using a DTW algorithm as described above with reference to FIG. 9. After determining the difference value between the most recent points and the mature path, the scanner determines if there is an additional path with a region overlapping with the most recent points (1240). If there is an additional mature path with a region overlapping with the most recent points, the scanner will determine the additional difference value between the additional mature path and the most recent points. Otherwise, the scanner determines if the least difference value is less than the difference threshold (1250).

If the least difference value is not less than the difference threshold, then the scanner generates a candidate path as the current path and adds the candidate path to the path library (1254). The scanner generates the candidate path based on the most recent points. The scanner can generate a candidate path using various methods and functions. For example, the scanner can perform a cost function minimization of the most recent points to generate a time-dependent multivariate polynomial function for the candidate path. The candidate path can be limited to start at or near the position of the earliest point of the most recent points and end at or near the position of the latest point of the most recent points (i.e. the current point). In addition, the scanner can implement a minimum cost function limit to prevent overfitting of the candidate path to the most recent points. In some instances, the scanner can generate multiple candidate paths based on the same set of most recent points and add each of the candidate paths as immature paths to the path library.

If the least difference value is less than the difference threshold, the path with the least difference value is established as the current path and is updated with the most recent points (1258). For example, the scanner can update the current path based on the K most recent points using the path updating method described above with reference to the description for FIG. 9. The scanner then determines if the current path is a mature path (1262). If the current path is already a mature path, the scanner can use the mature path during a path analysis.

If the current path is not a mature path, the path determines whether the current path meets a set of reliability criteria (1270). The set of reliability criteria are a set of one or more criterion that determines whether a path is sufficiently reliable during a path analysis. The reliability criteria can include criterion such as: that a minimum number of sets of points are used to generate the current path, a cost function value does not exceed a maximum cost threshold when generating/re-generating a path, the current path length is greater than a path length threshold, etc. For example, the reliability criteria can be that a normalized cost incurred during the re-generation of the current path does not exceed 0.5 units and that at least 20 sets of consecutive points are used to generate the current path. If the current path does not meet the reliability criteria, the scanner does not change the status of the current path. Otherwise, the scanner establishes the current path as a mature path in the path library (1274). Once the current path is established as a mature path, the newly-mature path can be used during a path analysis.

Variations

The above example illustrations describe generating an anomaly event when a point is assigned to an anomaly cluster. Embodiments, however, can also generate an event when a point is assigned to a canonical cluster based on an assumption that preceding behavior was not canonical. If preceding behavior was not canonical, then preceding multivariate data slices representing that preceding behavior can be referenced or indicated in an event for analysis.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus. In addition, while points are determined from the transformation of multivariate data slice, points can also be determined based on measurements from individual time instants.

With respect to the description for FIG. 9, the path analysis condition can be or can include a condition that a recurring path analysis period has been reached. For example, the path analysis conditions can be that the path analysis is to be performed every 30 minutes and that a 30-minutes interval has elapsed. In addition, while the paths can be based on multivariate polynomial functions, a path can also be based on a weighted summation of multivariate sinusoidal functions, a weighted summation of exponential functions, a multivariate linear interpolation function, etc. In addition, instead of determining a difference value between a mature/immature path and the most recent points by generating a simulated set of points based on the mature/immature path, the scanner can generate a candidate path based on the most recent points and compare the candidate path to the mature/immature path using the DTW algorithm. In addition, instead of using the DTW algorithm to determine a difference value, the scanner can generate a candidate path based on the most recent points and determine the difference value based on a Fréchet distance between the candidate path and the mature path. In addition, with reference to the description for FIG. 12, the path library modification condition can be that a recurring path library modification period has been reached. For example, the path library modification conditions can be that the path library modification operations are to be performed every 10 minutes and a 10-minutes interval has elapsed. Also, instead of generating a candidate path in response to the least difference value being greater than the difference threshold, a candidate path that had been generated at an earlier stage (e.g., generated during the determination of a Fréchet distance) can be used as the current path.

Machine-Readable Media and Example Computer System

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that can communicate, propagate, or transport a program for use by or in connection with an instruction execution system, apparatus, or device, but is not a machine-readable storage medium.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 13:
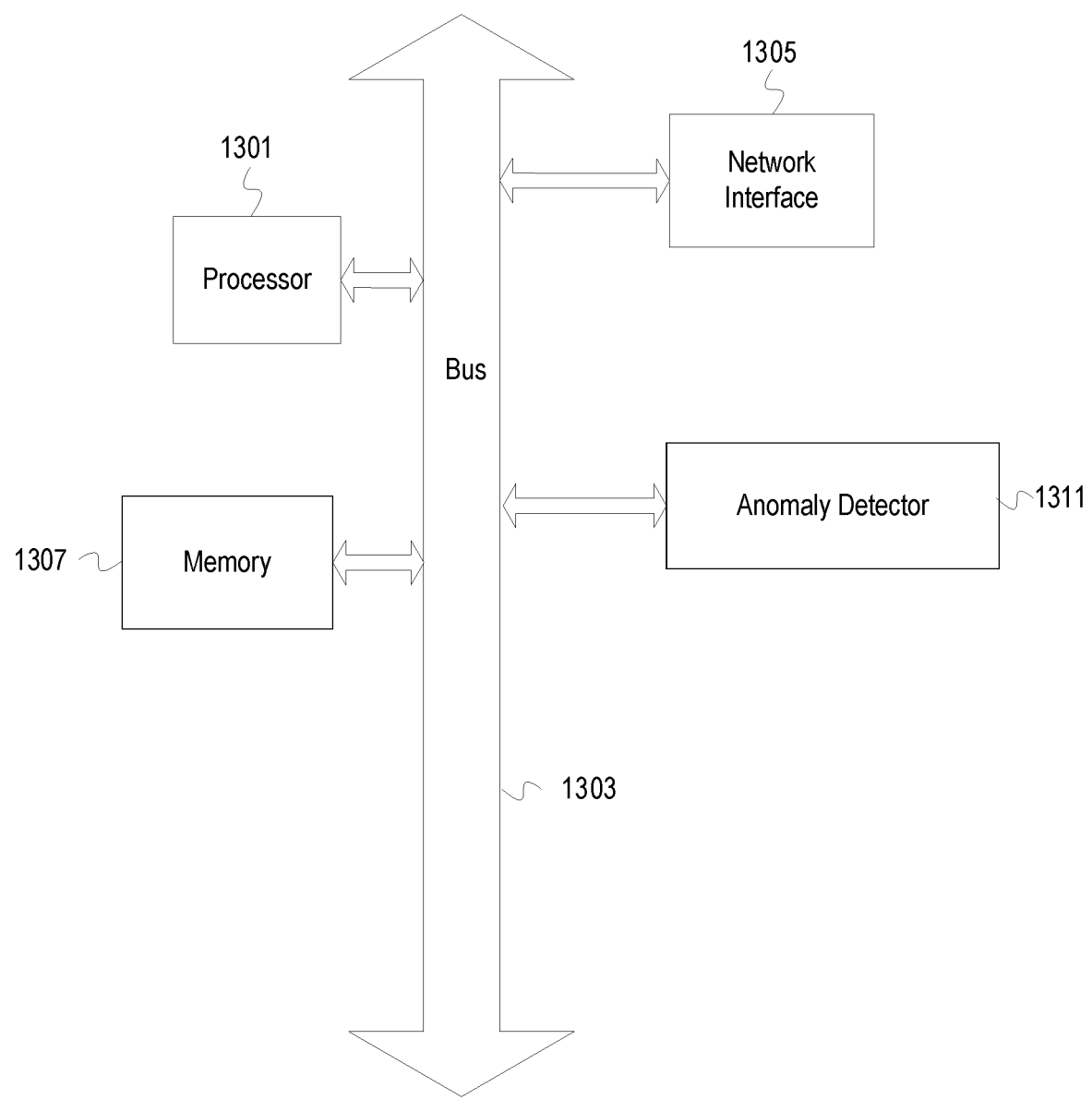
FIG. 13 depicts an example computer system with a multivariate clustering-based anomaly detector.

FIG. 13 depicts an example computer system with a multivariate path-based anomaly detector. The computer system includes a processor 1301 (possibly including multiple processors, multiple cores, multiple nodes, and/or implementing multi-threading, etc.). The computer system includes memory 1307. The memory 1307 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, magnetic memory, etc.) or any one or more of the above already described possible realizations of machine-readable media. The computer system also includes a bus 1303 (e.g., PCI, ISA, PCI-Express, HyperTransport® bus, InfiniBand® bus, NuBus, etc.) and a network interface 1305 (e.g., a Fiber Channel interface, an Ethernet interface, an internet small computer system interface, SONET interface, wireless interface, etc.). The system also includes an anomaly detector 1311. The anomaly detector 1311 scans multivariate data slices of an application component(s) in a transaction execution path to detect anomalies. The anomaly detector 1311 selects metrics at least based on the transaction execution path. So, metrics of components of a distributed application that are not active (i.e., not within the execution path) are not scanned. The anomaly detector 1311 uses multivariate clustering analysis to determine whether a behavior of a distributed application is canonical behavior, a known anomaly, or an unknown anomaly and transforms the metric data slices to vectors/points. The anomaly detector 1311 compares a history of the vectors/points to paths in order to generate prediction events indicating future behaviors of the distributed application. Any one of the previously described functionalities may be partially (or entirely) implemented in hardware and/or on the processor 1301. For example, the functionality may be implemented with an application specific integrated circuit, in logic implemented in the processor 1301, in a co-processor on a peripheral device or card, etc. The processor 1301 and the network interface 1305 are coupled to the bus 1303. Although illustrated as being coupled to the bus 1303, the memory 1307 may be coupled to the processor 1301.

While the aspects of the disclosure are described with reference to various implementations and exploitations, it will be understood that these aspects are illustrative and that the scope of the claims is not limited to them. In general, techniques for multivariate clustering analysis of sets of application related metrics to detect anomalies for a distributed application as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    based on a determination that a first dimensionally reduced representation of a first time-series multivariate dataset of a first set of metrics of a distributed application is not in one of a plurality of clusters that each corresponds with a behavior of the distributed application as represented by the first set of metrics, selecting a first set of dimensionally reduced representations of time-series multivariate datasets that preceded the first time-series multivariate dataset;
    determining whether the selected first set of dimensionally reduced representations and the first dimensionally reduced representation occur along a first path described by a first time-dependent multivariate function, wherein the first path overlaps with at least a first cluster of the plurality of clusters; and
    based on a determination that the selected first set of dimensionally reduced representations and the first dimensionally reduced representation occur along the first path with at least a confidence value that satisfies a confidence threshold, generating an event that predicts the first set of metrics of the distributed application will exhibit the behavior corresponding with the first cluster.

2. The method of claim 1 further comprising identifying a series of at least n dimensionally reduced representations of time-series multivariate datasets that precede the first dimensionally reduced representation and that were not in any of the plurality of clusters, based on the determination that the first dimensionally reduced representation is not in one of the plurality of clusters, wherein the series includes the first set of dimensionally reduced representations.

3. The method of claim 2, wherein selecting the first set of dimensionally reduced representations comprises selecting the first set of dimensionally reduced representations from the series.

4. The method of claim 1, wherein determining whether the selected first set of dimensionally reduced representations and the first dimensionally reduced representation occur near the first path comprises determining whether at least a subset of the first set of dimensionally reduced representations and the first dimensionally reduced representation occurs within a defined distance of a curve described by the first time-dependent multivariate function.

5. The method of claim 4 further comprising:
    generating a simulated set of points with the first time-dependent multivariate function and based on time instants corresponding with the first set of dimensionally reduced representations and the first dimensionally reduced representation;
    determining a first cost value using a dynamic time warping method based on the simulated set of points and the first set of dimensionally reduced representations and the first dimensionally reduced representation; and
    generating a first difference value based on the cost value.

6. The method of claim 5 further comprising:
selecting a plurality of time-dependent multivariate functions based on the first set of metrics or the plurality of clusters, wherein the plurality of time-dependent multivariate functions comprises the first time-dependent multivariate function,
determining whether the first set of dimensionally reduced representations and the first dimensionally reduced representation occur along or near a second path described by a second of the plurality of time-dependent multivariate functions, wherein the second path overlaps with the first cluster or a different one of the plurality of clusters;
generating a second simulated set of points with the second time-dependent multivariate function and based on the time instants corresponding with the first set of dimensionally reduced representations and the first dimensionally reduced representation;
determining a second cost value using the dynamic time warping method based on the second simulated set of points and the first set of dimensionally reduced representations and the first dimensionally reduced representation;
generating a second difference value based on the second cost value; and
determining that the first difference value is less than the second difference,
wherein generating the event comprises indicating information corresponding to the first path in the event based on the first difference value being less than the second difference value.

7. The method of claim 1, wherein generating the event comprises generating the event with information that predicts an amount of time before the distributed application exhibits the predicted behavior, wherein the amount of time is based on the first path.

8. The method of claim 7 further comprising:
determining a transition speed based on a ratio comprising an interpoint distance between a pair of reduced representations from the first set of dimensionally reduced representations and a time difference corresponding to the pair of reduced representations; and
determining the amount of time based on the transition speed and a position of the first dimensionally reduced representation.

9. The method of claim 1 further comprising selecting a plurality of time-dependent multivariate functions that describe a plurality of paths to one or more of the plurality of clusters based on the first set of metrics, wherein plurality of time-dependent multivariate functions includes the first time-dependent multivariate function.

10. The method of claim 1, further comprising:
based on a determination that a second dimensionally reduced representation of a second time-series multivariate dataset is in one of the plurality of clusters, determining whether at least n dimensionally reduced representations of time-series datasets serially precede the second time-series multivariate dataset and are not in one of the plurality of clusters; and
based on a determination that at least n dimensionally reduced representations of time-series datasets serially precede the second time-series multivariate dataset and are not in one of the plurality of clusters, determining whether a second time-dependent function can be established to describe a second path upon which the second dimensionally reduced representation and the n dimensionally reduced representations occur.

11. An apparatus comprising:
a processor;
a network interface; and
a machine-readable medium having program code stored thereon, the program code executable by the processor to cause the apparatus to,
based on a determination that a first dimensionally reduced representation of a first time-series multivariate dataset of a first set of metrics of a distributed application is not in one of a plurality of clusters that each corresponds with a behavior of the distributed application as represented by the first set of metrics, select a first set of dimensionally reduced representations of time-series multivariate datasets that preceded the first time-series multivariate dataset;
determine whether the selected first set of dimensionally reduced representations and the first dimensionally reduced representation occur along a first path described by a first time-dependent multivariate function, wherein the first path overlaps with at least a first cluster of the plurality of clusters; and
based on a determination that the selected first set of dimensionally reduced representations and the first dimensionally reduced representation occur along the first path with at least a confidence value that satisfies a confidence threshold, generate an event that predicts the first set of metrics of the distributed application will exhibit the behavior corresponding with the first cluster.

12. The apparatus of claim 11, wherein the machine-readable medium comprises
program code executable by the processor to cause the apparatus to identify a series of at least n dimensionally reduced representations of time-series multivariate datasets that precede the first dimensionally reduced representation and that were not in any of the plurality of clusters, based on the determination that the first dimensionally reduced representation is not in one of the plurality of clusters, wherein the series includes the first set of dimensionally reduced representations.

13. The apparatus of claim 12, wherein the program code to determine whether the selected first set of dimensionally reduced representations and the first dimensionally reduced representation occur near the first path comprises program code executable by the processor to cause the apparatus to determine whether at least a subset of the first set of dimensionally reduced representations and the first dimensionally reduced representation occurs within a defined distance of a curve described by the first time-dependent multivariate function.

14. The apparatus of claim 13, wherein the machine-readable medium comprises program code executable by the processor to cause the apparatus to:
generate a simulated set of points with the first time-dependent multivariate function and based on time instants corresponding with the first set of dimensionally reduced representations and the first dimensionally reduced representation;
determine a first cost value using a dynamic time warping method based on the simulated set of points and the first set of dimensionally reduced representations and the first dimensionally reduced representation; and
generate a first difference value based on the cost value.

15. The apparatus of claim 13, wherein program code to generate the event comprises program code executable by the processor to cause the apparatus to generate the event with information that predicts an amount of time before the distributed application exhibits the predicted behavior, wherein the amount of time is based on the first path.

16. The apparatus of claim 15, wherein the machine-readable medium further comprises program code executable by the processor to cause the apparatus to select a plurality of time-dependent multivariate functions that describe a plurality of paths to one or more of the plurality of clusters based on the first set of metrics, wherein plurality of time-dependent multivariate functions includes the first time-dependent multivariate function.

17. The apparatus of claim 15, wherein the program code further comprises the program code executable by the processor to cause the apparatus to:
   based on a determination that a second dimensionally reduced representation of a second time-series multivariate dataset is in one of the plurality of clusters, determine whether at least n dimensionally reduced representations of time-series datasets serially precede the second time-series multivariate dataset and are not in one of the plurality of clusters; and
   based on a determination that at least n dimensionally reduced representations of time-series datasets serially precede the second time-series multivariate dataset and are not in one of the plurality of clusters, determine whether a second time-dependent function can be established to describe a second path upon which the second dimensionally reduced representation and the n dimensionally reduced representations occur.

18. One or more non-transitory machine-readable media having program code for path-based anomaly detection for a distributed application, the program code comprising instructions to:
   based on a determination that a first dimensionally reduced representation of a first time-series multivariate dataset of a first set of metrics of a distributed application is not in one of a plurality of clusters that each corresponds with a behavior of the distributed application as represented by the first set of metrics, select a first set of dimensionally reduced representations of time-series multivariate datasets that preceded the first time-series multivariate dataset;
   determine whether the selected first set of dimensionally reduced representations and the first dimensionally reduced representation occur along a first path described by a first time-dependent multivariate function, wherein the first path overlaps with at least a first cluster of the plurality of clusters; and
   based on a determination that the selected first set of dimensionally reduced representations and the first dimensionally reduced representation occur along the first path with at least a confidence value that satisfies a confidence threshold, generate an event that predicts the first set of metrics of the distributed application will exhibit the behavior corresponding with the first cluster.

19. The one or more non-transitory machine-readable media of claim 18, the program code further comprising instructions to identify a series of at least n dimensionally reduced representations of time-series multivariate datasets that precede the first dimensionally reduced representation and that were not in any of the plurality of clusters, based on the determination that the first dimensionally reduced representation is not in one of the plurality of clusters, wherein the series includes the first set of dimensionally reduced representations.

20. The one or more non-transitory machine-readable media of claim 18, wherein the program code comprising the instructions to determine whether the selected first set of dimensionally reduced representations and the first dimensionally reduced representation occur near the first path comprises instructions to determine whether at least a subset of the first set of dimensionally reduced representations and the first dimensionally reduced representation occurs within a defined distance of a curve described by the first time-dependent multivariate function.

* * * * *